(12) United States Patent
Griffith et al.

(10) Patent No.: US 11,987,313 B2
(45) Date of Patent: *May 21, 2024

(54) SOLAR POWERED ELECTRIC VEHICLE SYSTEM AND METHOD

(71) Applicant: Other Lab, LLC, San Francisco, CA (US)

(72) Inventors: Saul Thomas Griffith, San Francisco, CA (US); Hans von Clemm, San Francisco, CA (US)

(73) Assignee: OTHER LAB, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,100

(22) Filed: Jan. 19, 2023

(65) Prior Publication Data

US 2023/0150600 A1     May 18, 2023

Related U.S. Application Data

(63) Continuation of application No. 16/908,248, filed on Jun. 22, 2020, now Pat. No. 11,560,194, which is a continuation of application No. PCT/US2020/038471, filed on Jun. 18, 2020.

(60) Provisional application No. 62/864,922, filed on Jun. 21, 2019.

(51) Int. Cl.
*B62J 45/00*     (2020.01)
*B62J 43/16*     (2020.01)
*B62K 11/04*     (2006.01)
*B62K 21/12*     (2006.01)

(52) U.S. Cl.
CPC ............... *B62J 45/00* (2020.02); *B62J 43/16* (2020.02); *B62K 11/04* (2013.01); *B62K 21/12* (2013.01); *B62K 2204/00* (2013.01)

(58) Field of Classification Search
CPC ...................... B62J 45/00; B62J 43/16; B62K 11/04; B62K 2204/00
See application file for complete search history.

(56) References Cited

U.S. PATENT DOCUMENTS

| 5,097,922 | A | 3/1992 | Stagi et al. |
| 5,489,002 | A | 2/1996 | Streiff |
| 6,021,862 | A | 2/2000 | Sharan |
| 6,155,369 | A | 12/2000 | Whittaker |

(Continued)

FOREIGN PATENT DOCUMENTS

| CN | 102963261 A | 3/2013 |
| CN | 202879266 U | 4/2013 |

(Continued)

OTHER PUBLICATIONS

European Patent Office Extended Search Report dated Jun. 9, 2023, Patent Application No. 20826772.4, 15 pages.

(Continued)

*Primary Examiner* — Kevin Hurley
*Assistant Examiner* — Michael R Stabley
(74) *Attorney, Agent, or Firm* — Davis Wright Tremaine LLP

(57) ABSTRACT

A solar-powered vehicle that includes a body having a front end, rear end, top and opposing sides; two or more wheels; and a first and second solar panel assembly respectively disposed on the opposing sides of the body.

18 Claims, 29 Drawing Sheets

(56) References Cited

U.S. PATENT DOCUMENTS

| | | |
|---|---|---|
| 7,017,685 B2 | 3/2006 | Schoenberg |
| 8,701,800 B2 | 4/2014 | Hui et al. |
| 8,833,985 B2 | 9/2014 | Robertson et al. |
| 8,838,308 B2 | 9/2014 | Meyers |
| 9,090,207 B2 | 7/2015 | Meyers |
| 9,422,022 B2 | 8/2016 | Sharkan et al. |
| 9,555,679 B2 | 1/2017 | Pezza |
| 9,969,226 B2 | 5/2018 | Pezza |
| 10,454,407 B2 | 10/2019 | Plesniak et al. |
| 10,857,894 B2 | 12/2020 | Hosaka et al. |
| 10,858,061 B2 | 12/2020 | Montez et al. |
| 2004/0216929 A1 | 11/2004 | White |
| 2008/0210289 A1 | 9/2008 | Chen |
| 2009/0288698 A1* | 11/2009 | Chen .................. H02S 20/00 136/244 |
| 2011/0295454 A1 | 12/2011 | Meyers |
| 2011/0304200 A1 | 12/2011 | Saida et al. |
| 2012/0201015 A1 | 8/2012 | Robertson et al. |
| 2015/0042160 A1 | 2/2015 | Matsuda |
| 2018/0072164 A1 | 3/2018 | Plesniak et al. |
| 2018/0222332 A1 | 8/2018 | Hosaka et al. |
| 2018/0334216 A1 | 11/2018 | Montez et al. |
| 2019/0367129 A1 | 12/2019 | Ou et al. |

FOREIGN PATENT DOCUMENTS

| | | |
|---|---|---|
| CN | 203601514 U | 5/2014 |
| CN | 207510218 U | 6/2018 |
| DE | 9302621 U1 | 6/1993 |
| DE | 202004015640 U1 | 12/2004 |
| DE | 102011002251 A1 | 1/2012 |
| EP | 2559585 A1 | 2/2013 |
| JP | 2005253221 A | 9/2005 |
| KR | 100890779 B1 | 3/2009 |
| RU | 2669712 C2 | 10/2018 |

OTHER PUBLICATIONS

Australia Patent Office First Examination Report dated Apr. 19, 2023, Patent Application No. 2020297516, 4 pages.
International Search Report and Written Opinion dated Dec. 24, 2020, Patent Application No. PCT/IB2020/038471, 2 pages.
Australian Patent Office Second Examination Report dated Mar. 25, 2024, Application No. 2020297516, 4 pages.

* cited by examiner

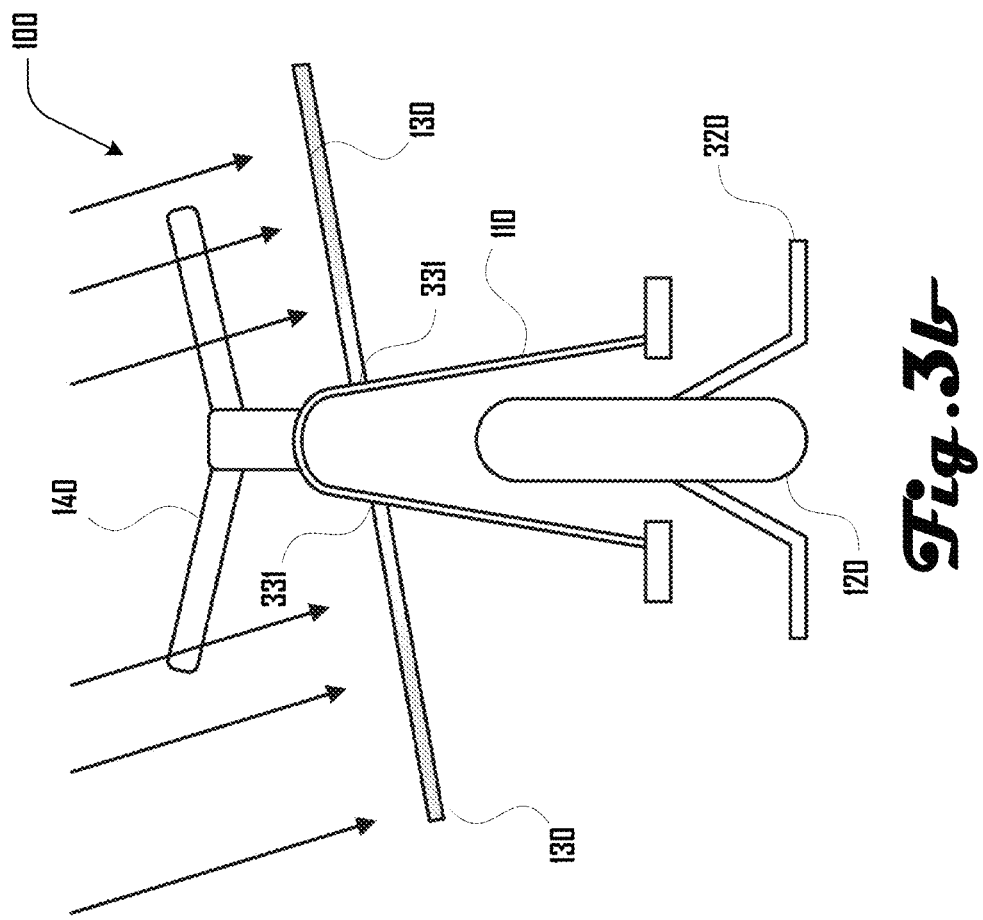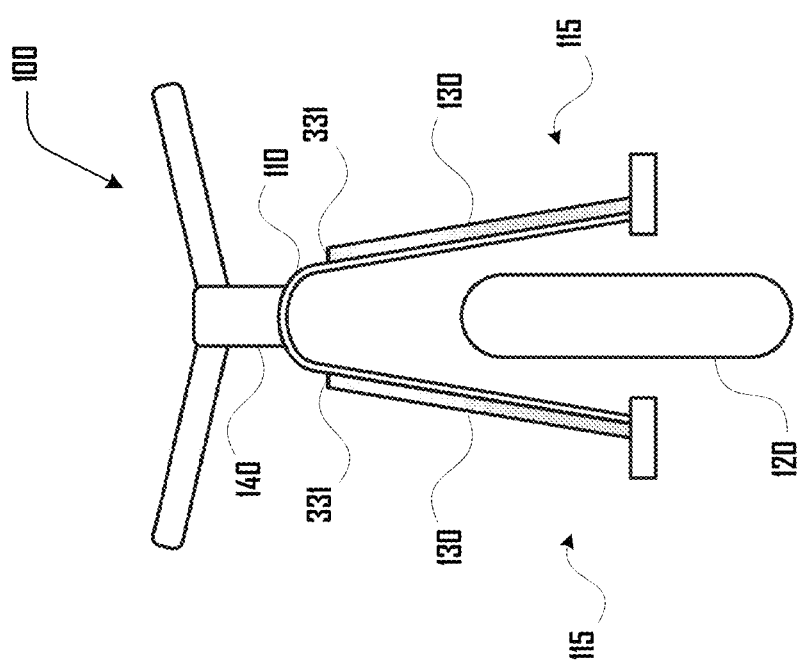

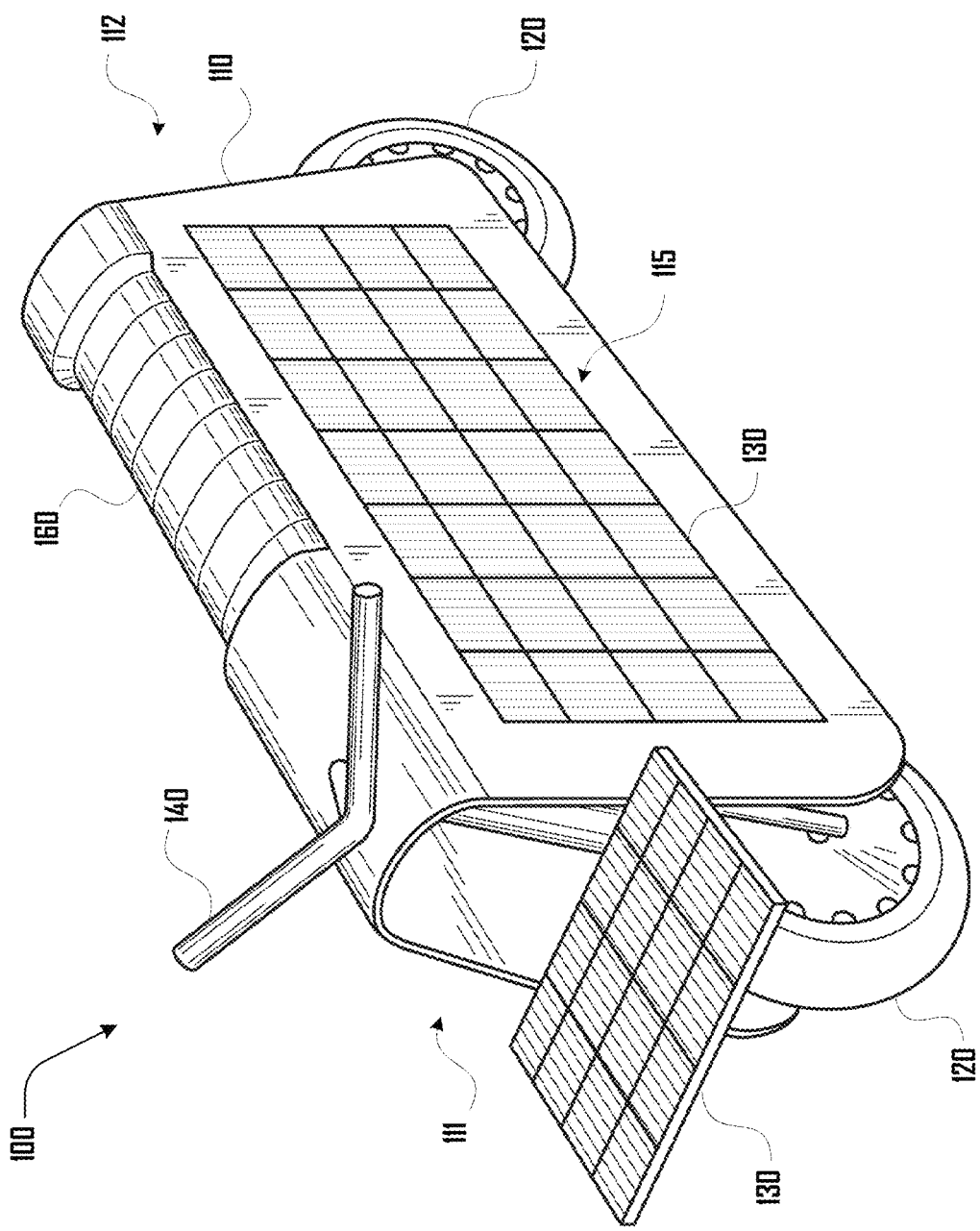

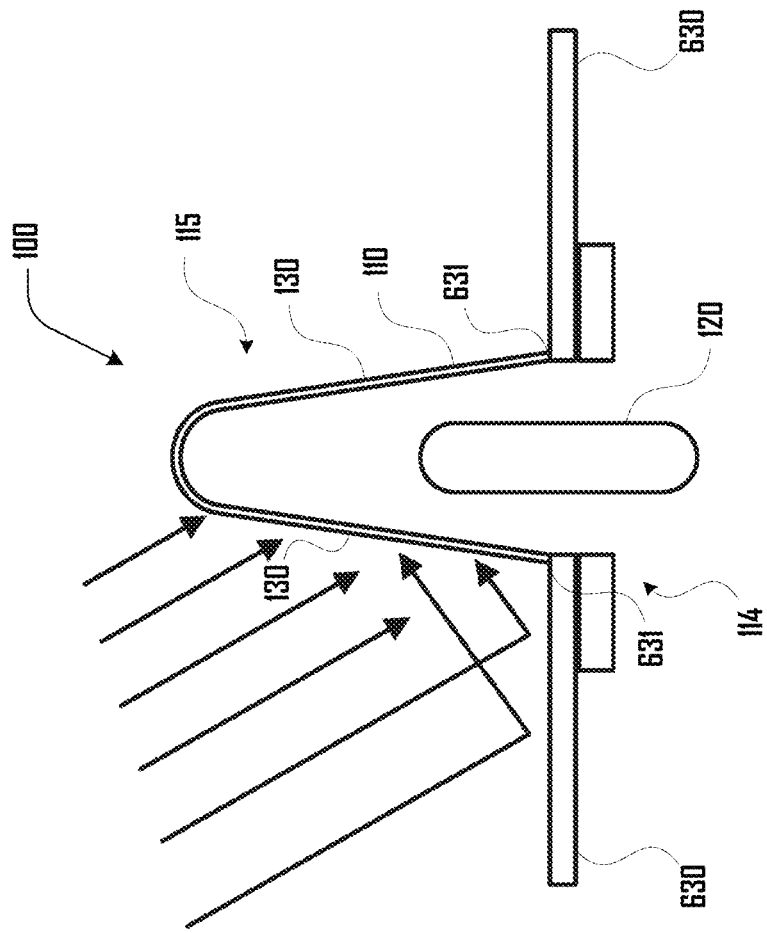
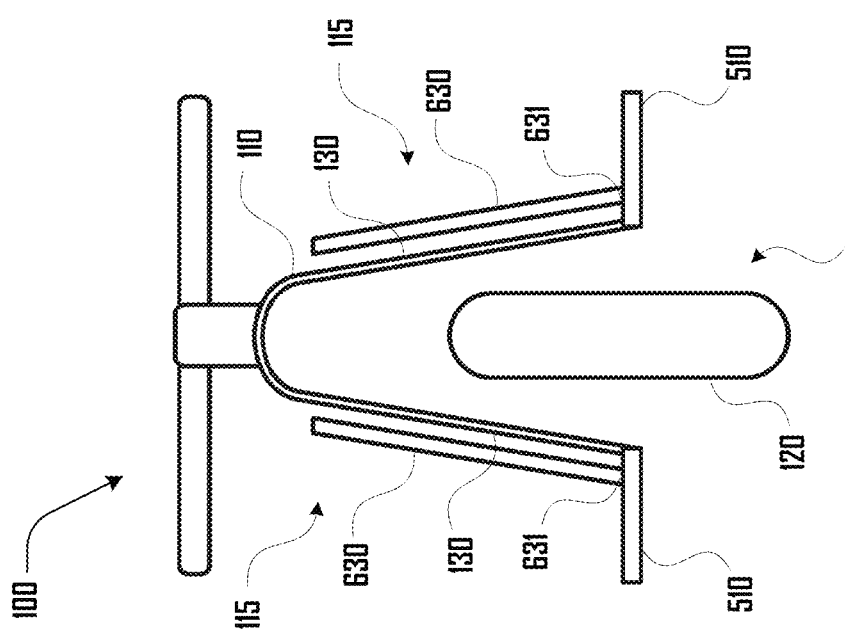

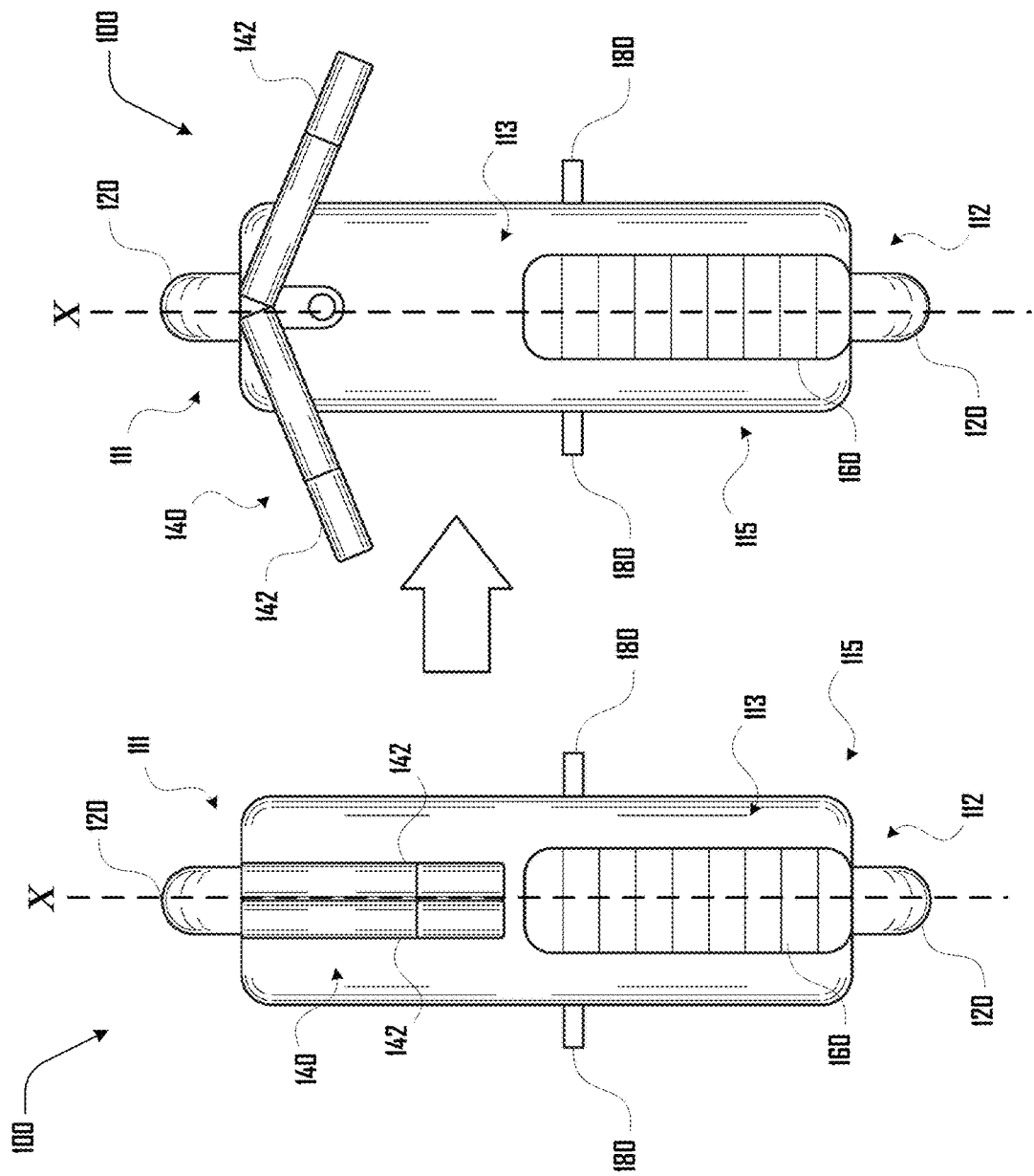

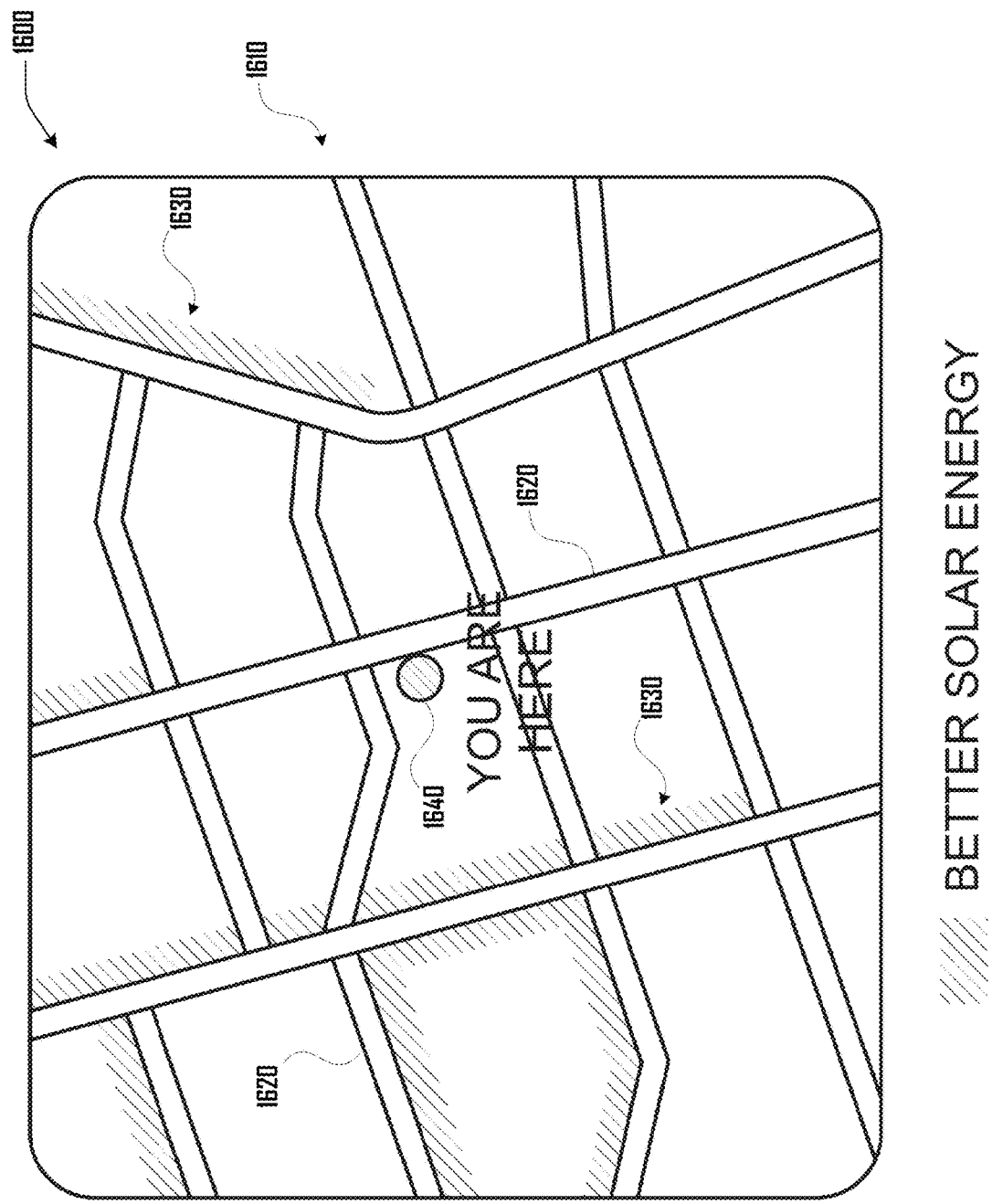

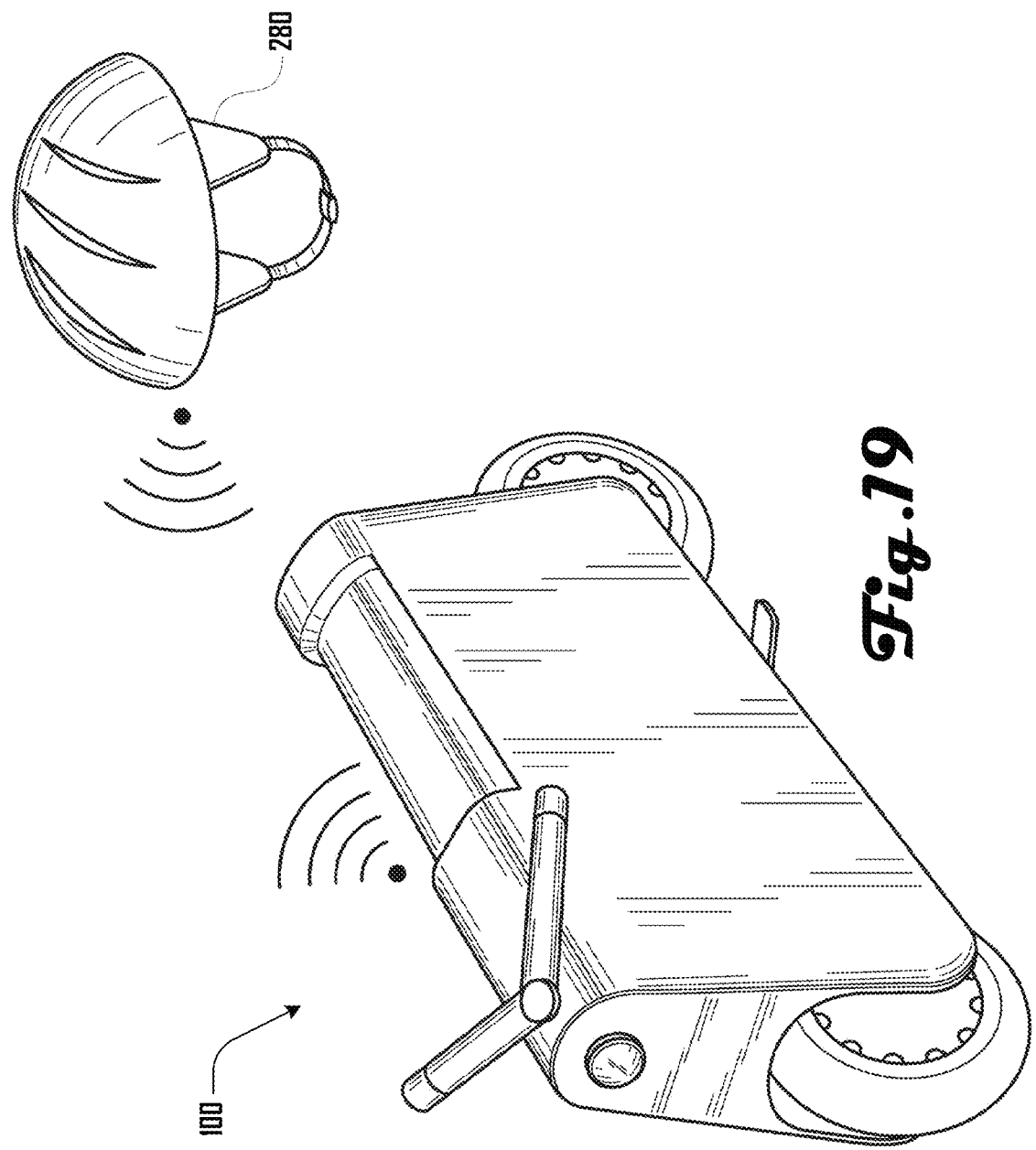

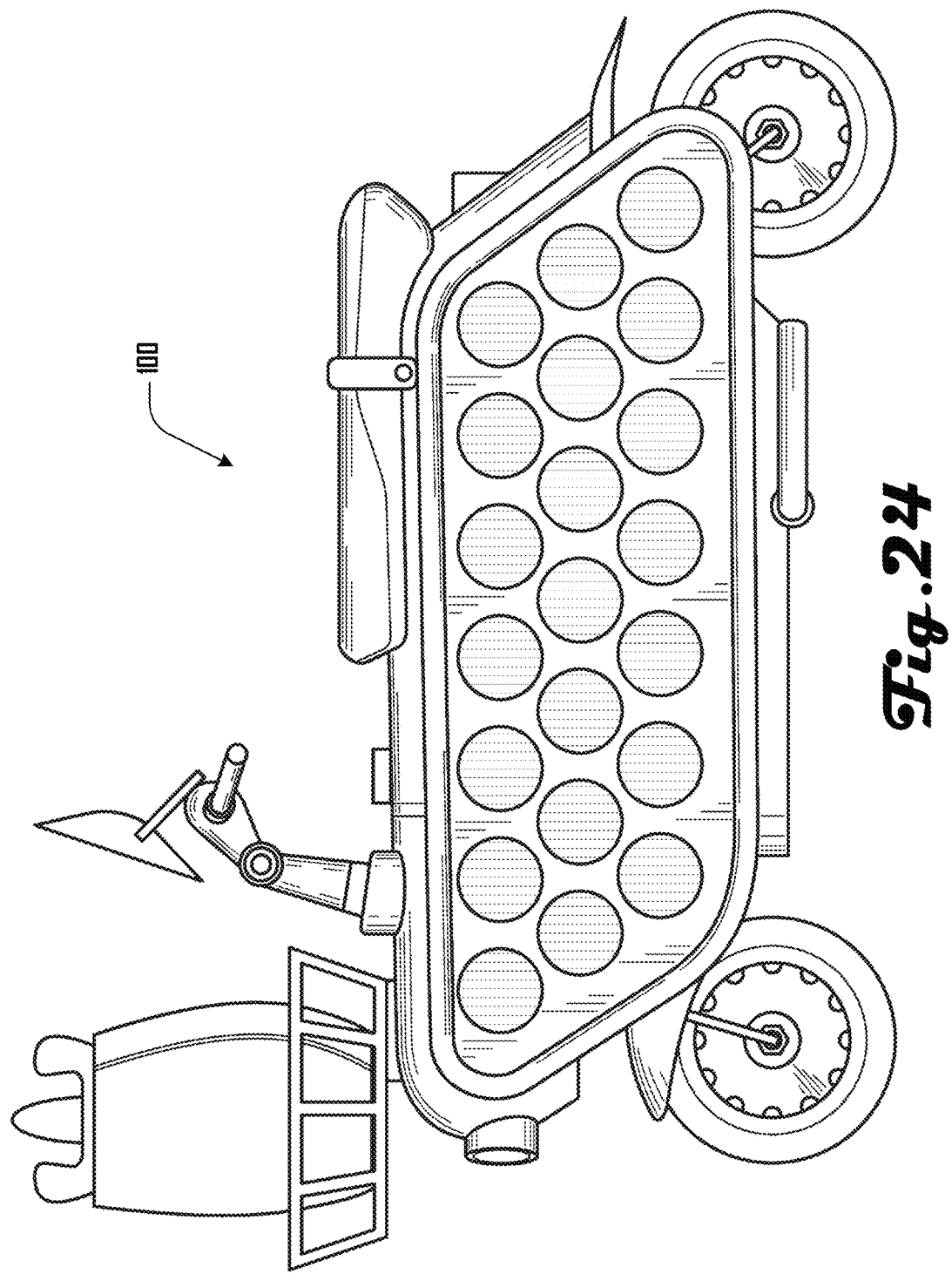

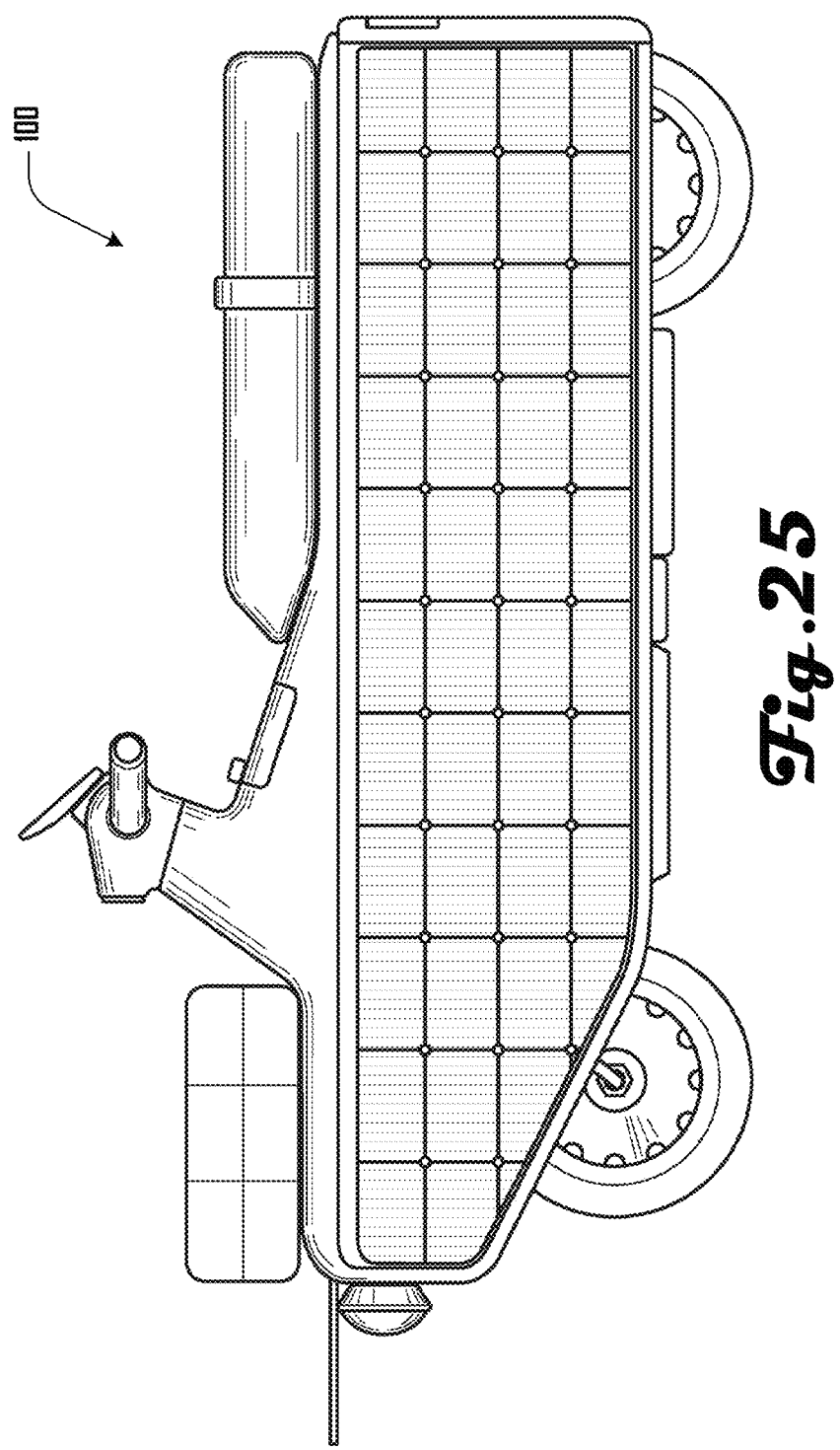

SOLAR POWERED ELECTRIC VEHICLE SYSTEM AND METHOD

CROSS-REFERENCE TO RELATED APPLICATIONS

This application is a continuation of U.S. application Ser. No. 16/908,248, filed Jun. 22, 2020, entitled "SOLAR POWERED ELECTRIC VEHICLE SYSTEM AND METHOD," which is a non-provisional of and claims the benefit of U.S. Provisional Application No. 62/864,922, filed Jun. 21, 2019 entitled "SOLAR POWERED ELECTRIC BIKE/MOPED/MOTORCYCLE;" U.S. application Ser. No. 16/908,248 is also a continuation of PCT/US2020/038471, filed Jun. 18, 2020 entitled "SOLAR POWERED ELECTRIC VEHICLE SYSTEM AND METHOD," which also claims the benefit of U.S. Provisional Application No. 62/864,922, filed Jun. 21, 2019 entitled "SOLAR POWERED ELECTRIC BIKE/MOPED/MOTORCYCLE, which applications are hereby incorporated herein by reference in their entirety and for all purposes.

BRIEF DESCRIPTION OF THE DRAWINGS

FIG. 1b is a second perspective view of an embodiment of the solar powered bike of FIG. 1a.

FIGS. 3a and 3b illustrate an example of a bike having solar panel assemblies disposed on and rotatably coupled on opposing sides of the body of the bike with FIG. 3a illustrating the solar panel assemblies in a folded-down configuration. FIG. 3b illustrates the solar panel assemblies in a folded-up configuration.

FIG. 4 illustrates an example embodiment having a foldable solar panel assembly disposed on the front of a bike.

FIGS. 6a and 6b illustrate an example of a bike comprising folding panels on opposing sides of the body of the bike, with FIG. 6a illustrating folding panels that can be folded up toward the body and FIG. 6b illustrating folding panels folding downward away from the body.

FIGS. 8a and 8b illustrate an example where the handlebars of a handlebar assembly are configured to rotate toward and away from a central axis X of the bike, where FIG. 8a illustrates a closed configuration of the handlebar assembly and FIG. 8b illustrates an open configuration of the handlebar assembly.

FIG. 13b illustrates another solar bike network comprising a first and second a bike-and-user-device pair and two bikes that are not part of a bike-and-user-device pair 1310, which can be operably connected to the network and bike server as shown in FIG. 13a.

FIG. 16 illustrates an example embodiment of a parking suggestion display that includes a map having a plurality of streets, suggested parking locations and current bike location indicator.

FIG. 18a illustrates an example of an arced kickstand defining a pair of legs that extend from opposing sides of the body of the bike and where FIG. 18b illustrates a close-up view of the example kickstand of FIG. 18b.

FIG. 19 illustrates an example embodiment of a helmet configured to interact with a bike wirelessly, which can provide for unlocking or setting a bike-use configuration of the bike.

FIG. 24 illustrates a side view of a bike in accordance with yet another embodiment.

FIG. 25 illustrates a side view of a bike in accordance with another embodiment.

Figure 1A:
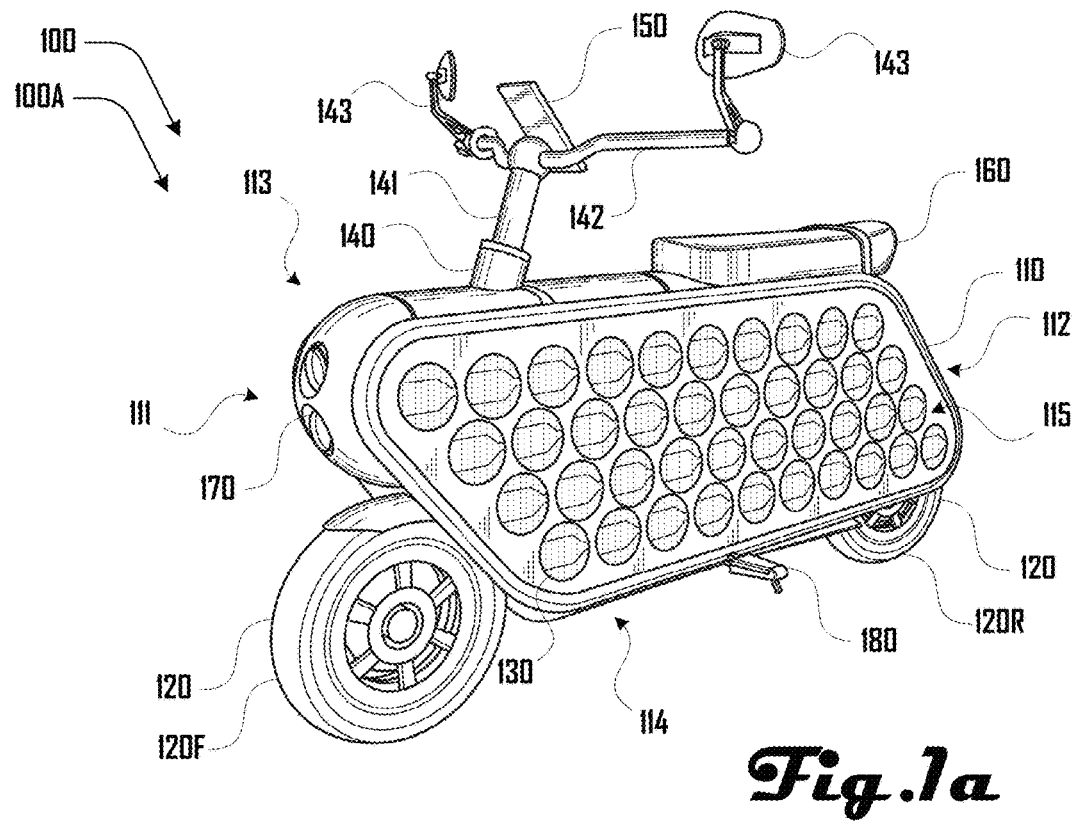
FIG. 1a is a first perspective view of an embodiment of a solar powered bike.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Mopeds, electric bikes, and motorcycles have short duty cycles and typically don't get ridden more than 10-20 miles per day. When electrified, these vehicles in some embodiments can consume 20-50 Wh/mile depending on top speed and total rider and vehicle weight. This allows for an opportunity for solar power to provide all of the daily range for this class of vehicles. Accordingly, various embodiments can include such vehicles that are completely self-sufficient and self-charging vehicles and that can be operated without external power such as being plugged into a changer, or the like.

Figure 1B:
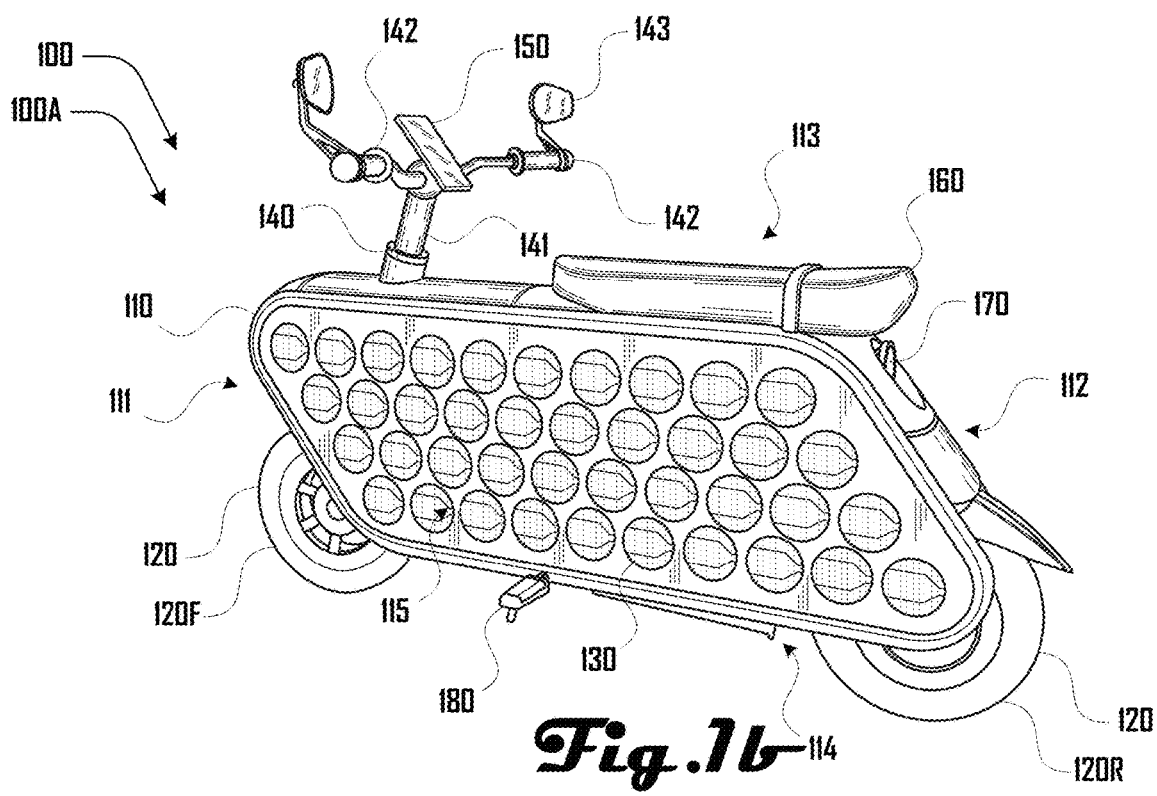
Figure 2:
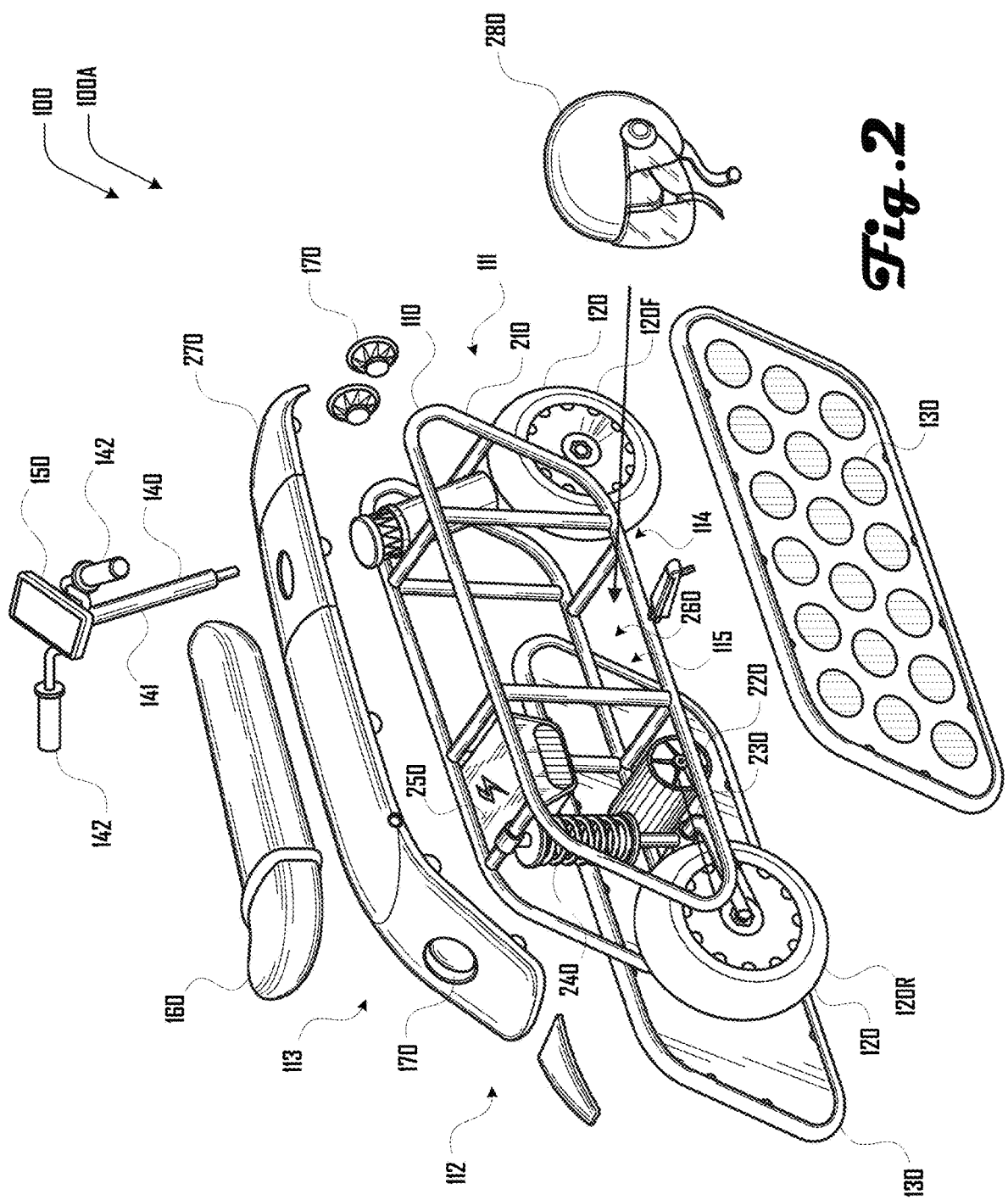
FIG. 2 is an exploded view of an embodiment of the solar powered bike of FIGS. 1a and 1b.

FIGS. 1a, 1b and 2 illustrate an example embodiment 100A of a solar powered bike 100 that comprises a body 110 having a front end 111, rear end 112, top 113, bottom 114 and sides 115. The bike 100 includes a pair of wheels 120 including a front wheel 120F at the front end 111 of the body 110 and a rear wheel 120R at the rear end 112 of the body 110. Solar panel assemblies 130 are disposed on opposing sides 115 of the body 110.

Solar panel assemblies 130 can have various suitable, shapes, sizes, and configurations and can include one or more solar cells, or the like. For example, the embodiment 100A shown in FIGS. 1a, 1b and 2 comprises a pair of solar panel assemblies 130 disposed in parallel on opposing sides 115 of the body 110 of the bike 100. However, in some embodiments, the solar panel assemblies 130 are disposed at an angle to each other on opposing sides 115 of the body 110 of the bike 100, including with symmetry about a central axis (see, e.g., FIGS. 3a, 3b, 7a, 7b, 8, 9a, 9b and the like). Additionally, in further embodiments, solar panel assemblies 130 can be disposed in various other suitable locations on the bike 100, including on the front end 111, rear end 112, top 113, and the like. In various embodiments, solar panel assemblies 130 can cover or define a substantial portion of the sided 115 of the body 110 of the bike 100, including greater than or equal to 100%, 95%, 90%, 85%, 80%, 75%, and the like.

A handlebar assembly 140 extends from the top 113 of the body 110 with the handle bar assembly 140 comprising a stem 141 extending from the top 113 of the body 110 with a pair of handlebars 142 extending from the stem 141. The handlebar assembly 140 can comprise mirrors 143 and a user interface 150. In some embodiments, the handlebar assembly 140 can include various suitable elements, such as a clutch, throttle, one or more brake levers, and the like. In various embodiments, the handlebar assembly 140 can be configured to turn the front wheel 120F for steering of the bike 100.

The bike 100 can further include a seat 160 on the top 113 of the body 110 proximate to the rear end 112 along with one or more lights 170 at the front and rear ends 111, 112 and one or more pedals 180 extending from the sides 115 of the body 110 at the bottom 114 of the body 110.

FIG. 2 illustrates an exploded view of the embodiment 100A shown in FIGS. 1a and 1b, which illustrates that the body 110 can comprise a frame 210 in which a motor 220, swing arm 230, rear suspension unit 240 and battery 250 can be disposed within a cavity 260 defined by the frame 210. A body cover 270 can be coupled to the frame 210 at the top end 113 of the body 113.

Figure 7A:
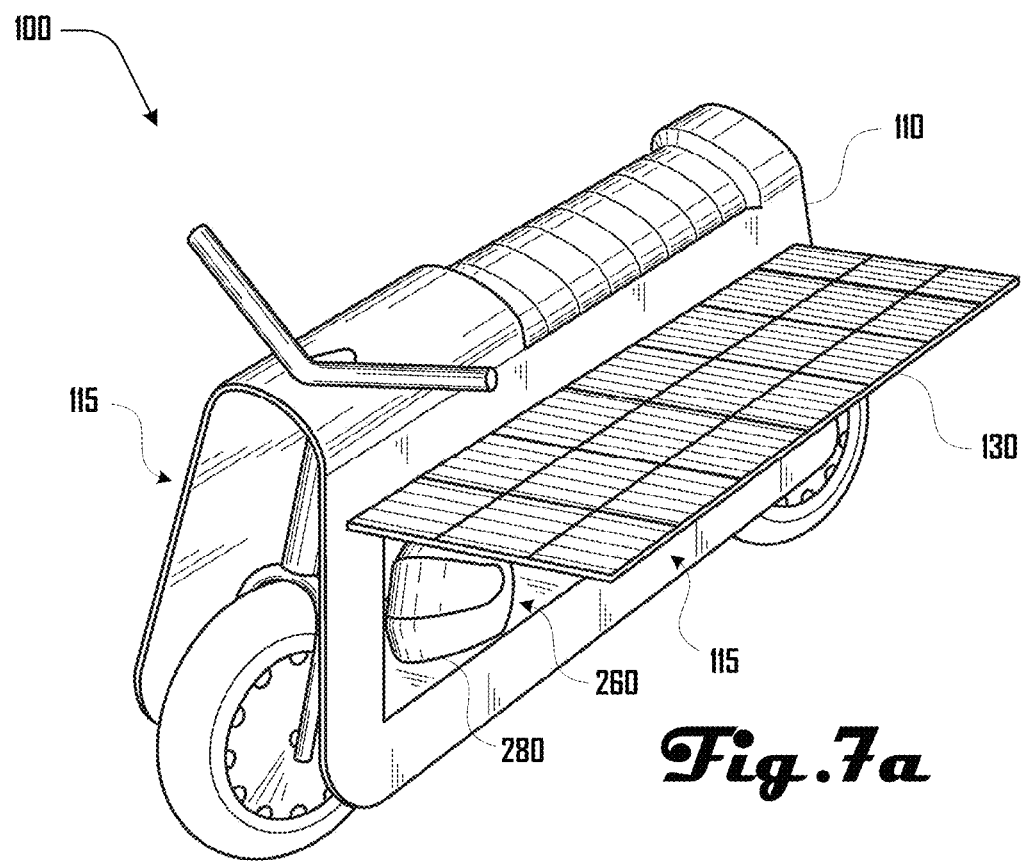
FIG. 7a illustrates an example of a bike where one or more of the solar panel assemblies are configured to fold up to expose a cavity where items such as a helmet can be stored.
Figure 7B:
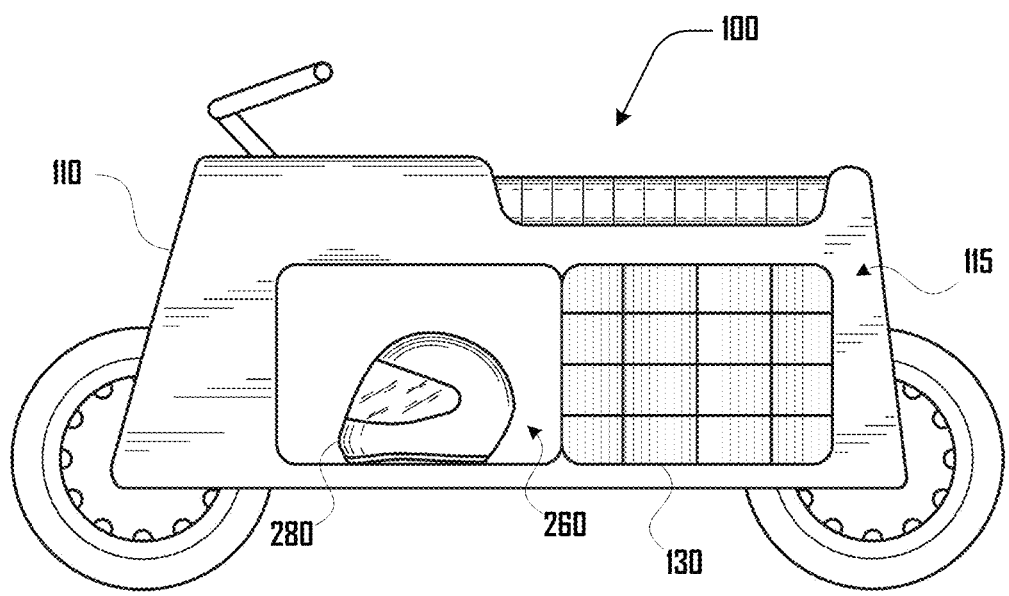
FIG. 7b illustrates an example, where one or more of the solar panel assemblies are configured to slide along the length of the body to expose a cavity where items such as a helmet can be stored.

In addition to housing various suitable elements of the bike 100, the cavity 260 of the frame 110 can provide for storage (e.g., of a helmet 280, and the like). For example, FIG. 7a illustrates an example, where one or more of the solar panel assemblies 130 are configured to fold up to expose the cavity 260 within the frame 210 where items such as a helmet 280 can be stored. FIG. 7b illustrates an example, where one or more of the solar panel assemblies 130 are configured to slide along the length of the body 110 to expose the cavity 260 within the frame 210 where items such as a helmet 280 can be stored. In various embodiments, the cavity 260 can be refrigerated and/or insulated which can be desirable for transport and storage of food, medicine, and the like.

In further examples, one or more solar panel assemblies 130 or other portions of the bike 100 can open, fold, roll or slide in various suitable ways to expose storage space within the body 110 of the bike 100.

In some embodiments, a bike 100 can comprise one or more solar panel assemblies 130 configured to fold up or out when not being ridden by a user such that such solar panel assemblies 130 can be better positioned or optimally positioned to face the sun. When riding, such solar panel assemblies 130 can be stowed, protected, or the like, and can fold down or into the side(s) 115 of the bike 100. This can be achieved in some examples with hinge mechanisms, but can also be achieved with slide mechanisms and more complicated linkages in further examples. The folding out of the solar panel assemblies 130 can be optimized in some embodiments with feedback via an electronic device, sound or other effect that can alert the user to facing the panels towards the predicted (and predictable) path of the sun and optimal placement for solar energy collection.

For example, FIGS. 3a and 3b illustrate an example of a bike 100 having solar panel assemblies 130 disposed on and rotatably coupled on opposing sides 115 of the body 110 of the bike 100 via hinges 331. FIG. 3a illustrates the solar panel assemblies 130 in a folded-down configuration, which can be suitable for riding the bike 100 and FIG. 3b illustrates the solar panel assemblies 130 in a folded-up configuration, which can be suitable for solar charging of the bike 100 while the bike 100 is stationary. FIG. 3b illustrates and example of a bike 100 comprising a kickstand 320, which can be deployed to hold the bike 100 in an upright position, which can be desirable for parking and charging of the bike 100 via the solar panel assemblies 130. Further embodiments can include foldable solar panels 130 in various other suitable locations. For example, FIG. 4 illustrates an example embodiment having a foldable solar panel assembly 130 disposed on the front 111 of a bike 100.

In various embodiments, one or more solar panel assemblies 130 of a bike 100 can be configured to trickle charge the battery 250. Such solar panel assemblies 130 can be rigid structures, can be foldable between the individual cells via hinges or along lines that are flexible, and the like.

Some embodiments can comprise elements that reflect sunlight onto solar panel assemblies 130 disposed on the side(s) 115 of the bike 100. Such reflective elements can comprise various suitable materials that reflect sunlight, including a metallic, glass or plastic mirror. In some embodiments, a reflective material can comprise polished or non-polished metal, a reflective paint, a glossy material, and the like. Such a reflective element can be flat, incorporate molded optical elements such as Frenel lenses, and the like.

Figure 5B:
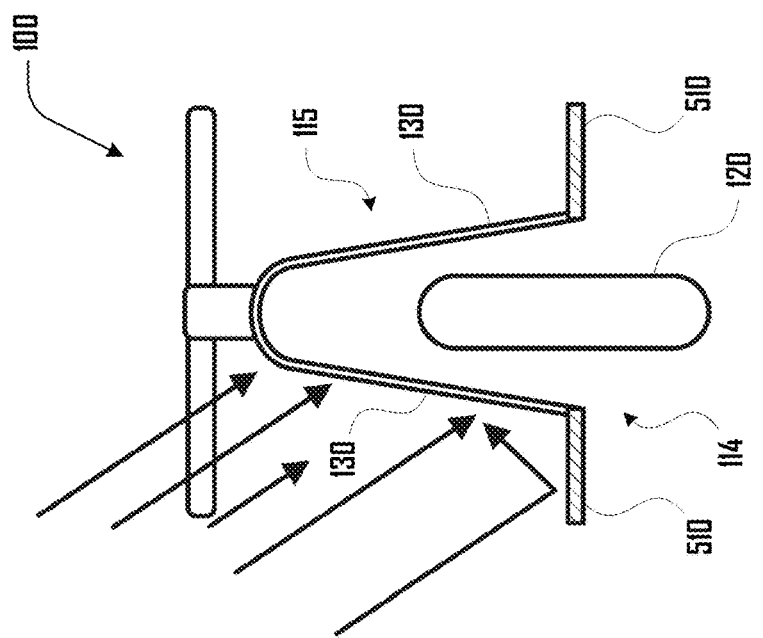
FIGS. 5a and 5b illustrate an example of a bike comprising baseboards extending along the bottom of the body of the bike with FIG. 5a illustrating a side view and FIG. 5b illustrating a front or rear view.
Figure 5A:
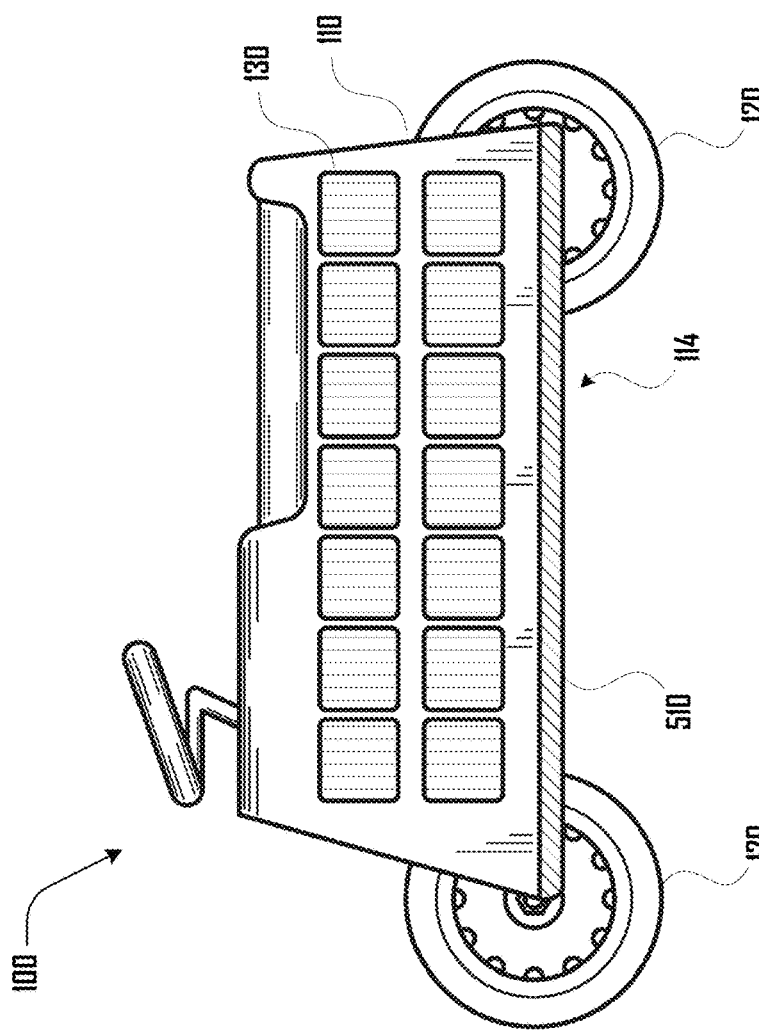

For example, FIGS. 5a and 5b illustrate an example of a bike 100 comprising baseboards 510 extending along the bottom 114 of the body 110 of the bike 100 on opposing sides 115 of the body 110, with the baseboards 510 extending away from the body 110 generally parallel to the ground and creating a planar shelf. In some embodiments, such baseboards 510 can comprise a reflective material that reflects sunlight onto solar panel assemblies 130 on opposing sides 115 of the body 110. Additionally, in various embodiments, the baseboards 510 can be used for foot placement and foot pegs when riding.

In another example, FIGS. 6a and 6b illustrate an example of a bike 100 comprising folding panels 630 on opposing sides 115 of the body 110 of the bike 100, which can be rotatably coupled at the bottom 114 of the body 110 via a rotatable coupling 631 such as a hinge. As shown in FIG. 6a the folding panels 630 can be folded up toward the body 110 and adjacent to the solar panel assemblies 130 on opposing sides 115 of the body 110, which can be a configuration for riding the bike 100. As shown in FIG. 6b, the folding panels 630 can be folded downward away from the body 110 and solar panel assemblies 130 to be generally parallel to the ground. In various embodiments, the folding panels 630 can comprise a reflective surface configured to reflect sunlight onto the respective solar panel assemblies 130.

In some embodiments, one or more of the folding panels 630 can comprise a solar panel assembly 130, solar cell, or the like. Additionally, folding panels 630 can be present in other suitable locations such as the front 111 or rear end 112 of the bike 100, which may similarly correspond to a respective solar panel assembly 130 in such a location.

While nearly any surface can have some reflectively, it should be clear that various embodiments discussed herein relate to reflective surfaces that reflect a substantial amount of light onto one or more solar panel assemblies 130 in terms of reflectivity and/or surface area of such reflective surfaces. In other words, it should be clear that such embodiments do not directly relate to nominal reflection from slightly reflective surfaces or nominal reflection from small surfaces. For example, in various embodiments, materials that define a reflective surface can have a reflection factor of greater than 50%, 60%, 70%, 80%, 90%, 95% or the like. Additionally, in various embodiments, a reflective surface configured to reflect light onto a solar panel assembly 130 (e.g., baseboards 510, folding panels 630, and the like) can have a reflective surface area equal to or greater than the surface area of the solar panel assembly 130, or 80%, 50%, 25%, 20%, 15 or 10% of the surface area of the solar panel assembly 130.

Various other elements of a bike 100 can be configured to be movable. For example, FIGS. 8a and 8b illustrate an example where the handlebars 141 of a handlebar assembly 140 are configured to rotate toward and away from a central axis X of the bike 100. Specifically, FIG. 8a illustrates a closed configuration of the handlebar assembly 140 where the handlebars 141 are rotated to be parallel to the central axis X without extending past the sides 115 of the body 110 of the bike 100. FIG. 8b illustrates an open configuration of the handlebar assembly 140 where the handlebars 141 are rotated away from the central axis X and extending past the sides 115 of the body 110 of the bike 100.

In some embodiments, such a rotatable handlebar assembly 140 can comprise a locking mechanism that locks the handlebars 141 in the closed configuration, which can be desirable for allowing the bike 100 to be inoperable, effectively unusable or less-operable while the handlebars 141 are in the closed position to prevent unauthorized users, who are unable to unlock the handlebar assembly 140, from using the bike.

Additionally, in some embodiments, the handlebars 141 in the closed configuration can cover or protect various elements on the top 113 of the body 110 of the bike 100. For example, the handlebars 141 in the closed configuration can cover or protect a user interface (e.g., a screen, buttons, gauges, or the like) or elements like a power plug, data plug, camera, microphone, speaker, compartment, an identifier (e.g., a barcode, QR code, or the like), a tool, a switch for opening a compartment, and the like. Such a configuration can be desirable because such elements can be protected from tampering, theft, or view of unauthorized users who are unable to unlock the handlebar assembly 140 or protection from undesirable environmental conditions such as rain, direct sunlight, and the like.

The bike 100 can include various suitable security features including a GPS dependent lockout (e.g., is a user interface 150 paired with the bike 100 on the bike?); a camera on the bike 100 with facial recognition that looks at the rider to verify the identity of the rider; secure chain locations, an integrated solenoid-based lock that only allows the lock to be opened and bike 100 to be operated under required condition (e.g., geolocation, rider identity, rider credentials, etc.), and the like. Some embodiments can include one or more cameras and/or audio system that begin to record based on detected movement (e.g., movement detected from a gyroscope or the like). Such information can be sent to a local and/or remote storage location in various examples and used in case of theft, vandalization of the bike 100, or the like.

Figure 9:
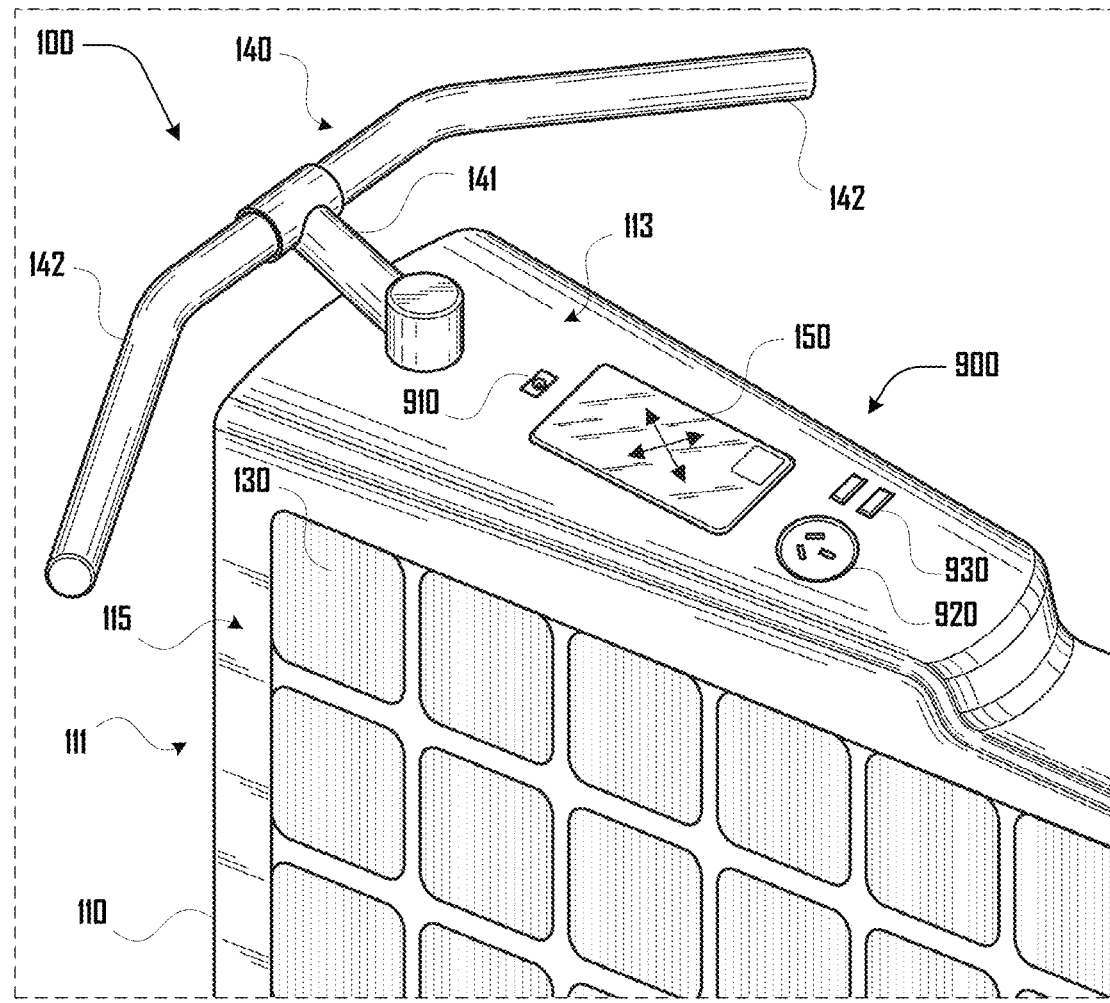
FIG. 9 illustrates a perspective view of an example of elements of a dashboard on the top of a bike.

FIG. 9 illustrates an example of elements of a dashboard 900 on the top 113 of a bike 100. In this example, the dashboard 900 comprises a user interface 150, camera 910, a power plug 920 and USB ports 930. In some embodiments, the user interface 150 can comprise elements (e.g., a screen, buttons, and the like) that are integral to the bike 100; however, in further embodiments, the user interface 150 can comprise a user device such as a smartphone, smartwatch, and the like. Such a user device can operably communicate with the bike 100 via wired and/or wireless communication (e.g., via a USB port 930, Bluetooth connection, and the like), which can allow a user to interact with and/or obtain information from the bike 100 as discussed in more detail herein.

The camera 910 can comprise various suitable imaging devices, including a digital camera that can generate images based on visible light, infrared, or the like. In some examples, the camera 910 can be used to authenticate the identity of a user, a license held by a user, a user account, (e.g., via facial recognition, scanning of a driver's license, scanning of a QR code), and the like, which can be used to unlock the bike 100, check out the bike for use 100, select a user profile for a rider, confirm that the user has a valid driver's license, and the like. Such example functionalities are discussed in more detail herein.

The power plug 920 and/or USB port(s) 930 can allow for power transfer to and/or from the bike 100. For example, in some embodiments, one or more batteries 250 of the bike 100 can be charged via plug 920 and/or USB port(s) 930. In some embodiments, external devices (e.g., a smartphone user device, laptops, lights, coolers, and the like) can obtain power from the plug 920 and/or USB port(s) 930, including potential use as a generator (e.g., as an emergency generator in natural disaster scenarios).

In some embodiments, the plug 920, USB port(s) 930, or the like can provide the ability to connect multiple bikes 100 together to enable direct cross-charging and/or power trading (e.g., trading battery charge from one bike 100 to another and also to/from external power supplies and users, including external solar panels and the like). Some embodiments can include the use of one or more bike battery systems in connection with residential solar for electricity load shifting.

Any suitable power ports or plugs can be used in various embodiments in terms of both type and number. In some examples, power plugs or ports can have a conventional form so that common or suitable power cords can be coupled with the plugs or ports to receive power from or provide power to a battery 250 of the bike 100. For example, plugs or ports can be conventional power types A-O, which can allow for the bike to be plugged into conventional power sources (e.g., a wall receptacle) to charge the bike 100. However, in some embodiments, it can be desirable to have a plug or port that is incompatible with a standard power plug. It can be desirable in some examples to have a proprietary plug or port that is incompatible with some or all standard power plugs to prevent users from charging the bike 100 while allowing charging by an administrator or at an authorized charging station. For example, for a bike 100 used in the United States, the plugs may be incompatible with type A and B plugs standard to the United States, which can prevent users from charging the bike 100 via wall receptacles in the United States.

Various suitable plugs or ports configured for data communication or data and power communication can be used and a USB (Universal Serial Bus) is only one example of such a suitable port, jack or plug. Additionally, in some examples, power can be provide to or obtained from the bike 100 via wireless power transmission such as inductive coupling. Additionally, in some embodiments, power and/or data ports or plugs can be absent from a bike 100. For example, in some embodiments, it can be desirable to have a bike 100 without the ability for users to charge the bike 100 via an external power source, and instead, during normal operation, the bike 100 will be required to rely only on solar power for operation. In such embodiments, charging of a battery 250 of a bike may be limited to battery swapping, or charging that is not accessible or usable by users.

Additionally, the example dashboard 900 of FIG. 9 should not be construed to be limiting on the wide variety of elements that may be present or absent in a dashboard 900 and should not be construed to be limiting on the location(s) where such elements may or may not be disposed on the bike 100. For example, FIG. 9 illustrates the user interface 150 disposed on the top 113 of the body 110 of the bike proximate to the front end 111, whereas FIGS. 1a and 1b illustrate a user interface disposed on the handlebar assembly 140. Any suitable additional elements can be part of the dashboard 900, including elements like a microphone, speaker, compartment, an identifier (e.g., a barcode, QR code, or the like), a tool, a switch for opening a compartment, and the like. Additionally, some or all of a dashboard 900 can be configured to be covered by movable handlebars (e.g., as shown and discussed in relation to FIGS. 8a and 8b).

In various embodiments, a bike 100 can be configured for energy recovery. For example, the majority of braking in various vehicles is performed on the front-most wheel(s) due to momentum transfer. Consequently, in some examples, having motors at all wheels can assist in recovering maximum benefit with a mechanical brake as override for safety on the front wheel. In some embodiments, a bike 100 can comprise a front mechanical brake and/or rear electrical (regenerative) braking and/or a bike 100 can have front electrical and/or rear electrical braking with front mechanical brake override.

Figure 10:
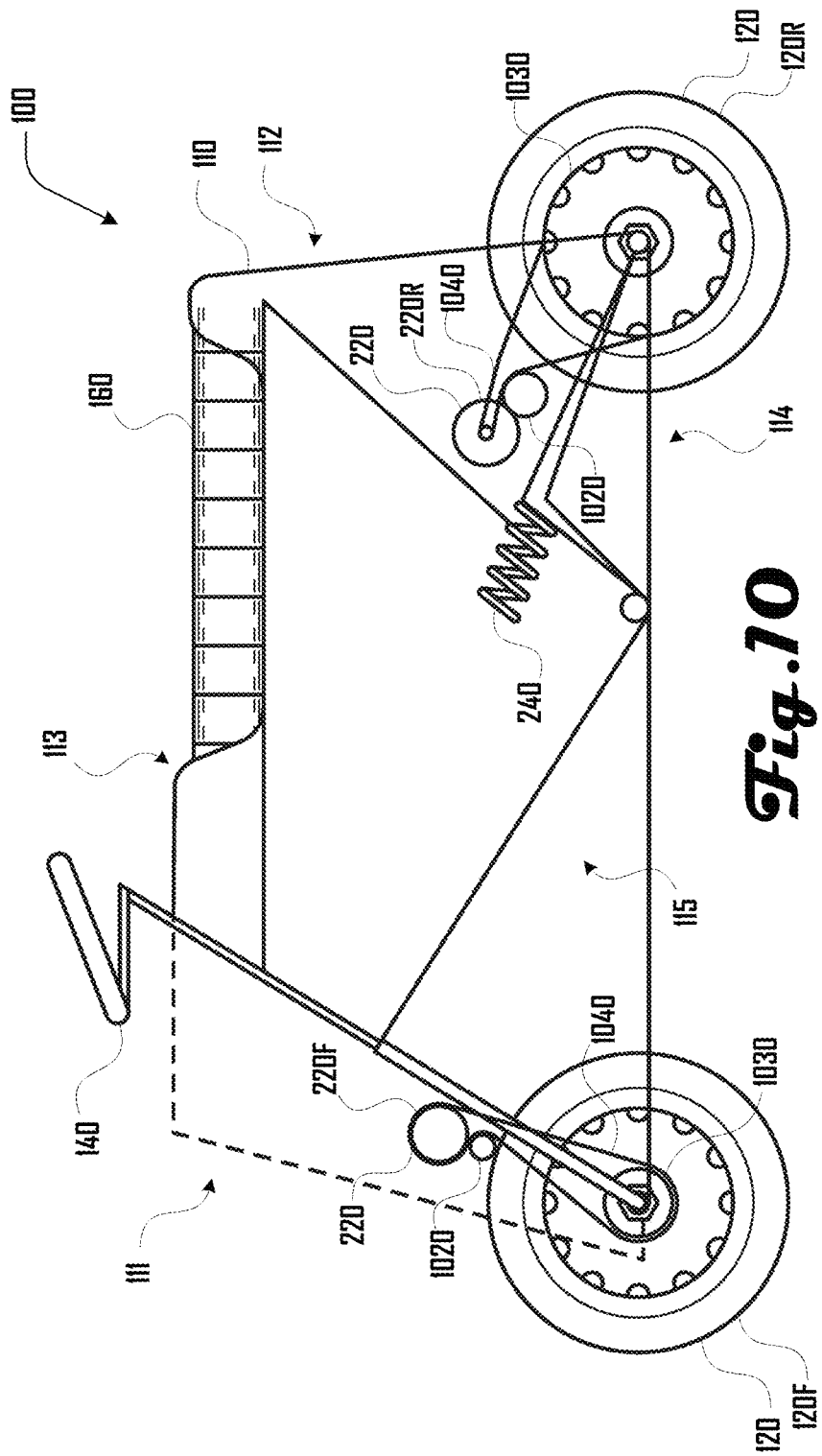
FIG. 10 illustrates a side view an example of a bike that comprises two motors.

FIG. 10 illustrates an example of a bike 100 that comprises two motors 220 including, at the front end 111, a front motor 220F associated with a hub 1030 (e.g., sprocket or pulley) of the front wheel 120F and an idler gear 1020 via a line 1040 (e.g., chain or belt). The bike 100 further includes, at the rear end 112, a rear motor 220R associated with a hub 1030 (e.g., sprocket or pulley) of the rear wheel 120R and an idler gear 1020 via a line 1040 (e.g., chain or belt). In such an example, regenerative breaking can be present at both wheels 120, which generates power that can be combined with solar power generated by solar panel arrays 130. In various embodiments, the bike can comprise two motors 220 where one motor 220 provides low torque and the other motor 220 provides high speed where the low torque motor is either clutched to eliminate high RPM back EMF or uses dynamic field weakening. In some examples, it can be desirable for one motor 220 to provide high torque and the other motor 220 to provide high speed. Some embodiments of a bike 100 can have a two-wheel drive arrangement with regenerative braking and antilock braking at both wheels 120 to maximize the return of energy from (mostly) the front wheel 120F under braking. Further examples can include one or more mechanical brakes and one or both wheels 120 for safety purposes, or the like.

Figure 11:
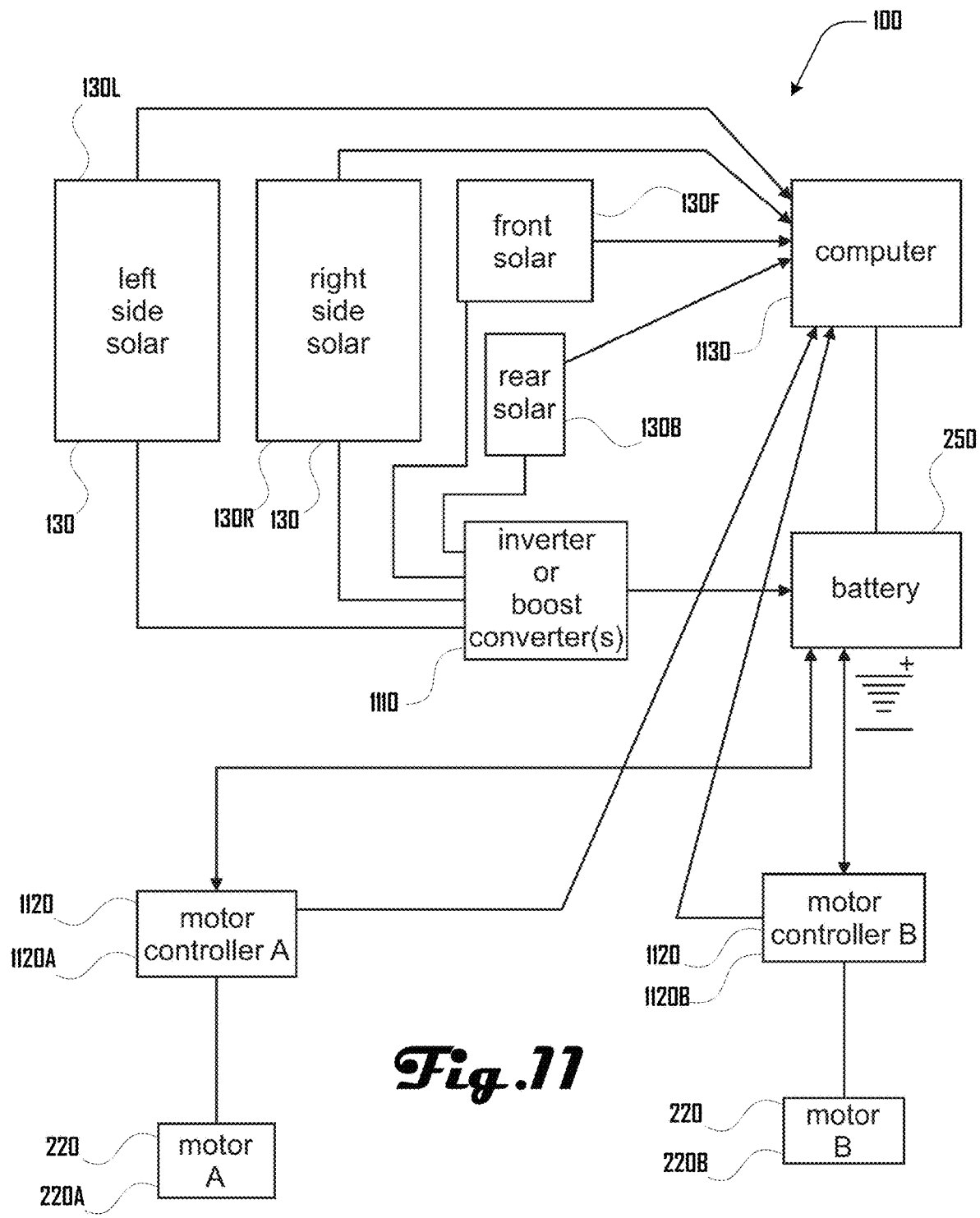
FIG. 11 illustrates a block diagram of a bike in accordance with an embodiment.

FIG. 11 illustrates a block diagram of a bike 100 in accordance with an embodiment, which comprises a set of solar panel assemblies 130, including a left, right, front and rear/back solar panel assembly 130L, 130R, 130F, 130B, which are connected to an inverter (or one or more boost converters) 1110. The inverter 1110 can receive and modify electric power generated by the solar panel assemblies 130 (e.g., convert received electric power from direct current (DC) to alternating current (AC)) and provide the modified electric power to one or more battery 250, where the electric power can be stored. The one or more battery 250 can be coupled to a first and second motor controller 1120A, 1120B, which can be respectively coupled to a first and second motor 220A, 220B. The battery 250 can provide power to the motor controllers 1120, which can in turn drive the respective motors 220. Additionally, in various embodiments, one or both of the motor controllers 1120A, 1120B can provide power back to the battery 250 (e.g., via regenerative braking). In some embodiments a battery management system (BMS) allows for simultaneous charging and discharging of one or more battery 250 while the bike 100 is operational.

Various embodiments can include periodically co-opting a solar boost converter 1110 in power management in the drivetrain of a bike 100. In some embodiments, components in the boost converter and inverter 1110 as used by the solar system can be employed as resistances and capacitances useful to energy management in the drivetrain such as brief moments of high power such as braking. For example, during regenerative braking, if the peak motor loads exceed a charging capacity of the battery, the capacitors of a solar boost or buck converted could be employed in absorbing and dissipating the energy, and potentially recovered later. In various embodiments, solar power can be conditioned by a boost converter 1110 and can charge modular, replaceable and swappable batteries 205, which in turn power the drivetrain of the bike 100.

The bike 100 can further comprise a computing device 1130, which can be operably connected to the solar panel assemblies 130, battery 250, and motor controllers 1120. The computing device 1130 can be any suitable device and can include a processor, memory, and a network device that allows for wired and/or wireless communication with elements of the bike 100 and devices that are proximate to or remote from the bike 100 (see, e.g., FIGS. 13a and 13b). The computing device 1130 and/or bike 100 can comprise any suitable additional or alternative elements such as a positioning system (e.g., a global positing system (GPS)), compass, accelerometer, speedometer, and the like.

While various embodiments of a bike 100 derive power exclusively from batteries 250 and/or current generated by one or more solar panel assemblies 130, some embodiments can include pedals that are coupled to a generator that recharges one or more battery 250 (e.g., rather than a hybrid drivetrain that is mechanically coupled to the wheel 120). In various examples, the user can select a resistance for pedaling (e.g., 120 W or something that is comfortable or an appropriate amount of exercise) and that resistance can be controlled by the generator that can take the generated power and can condition the generated power for charging the one or more batteries 250 or some combination of powering one or more motor 220 and charging the one or more battery 250. In some embodiments, such a configuration can greatly reduce the complexity of the drivetrain of a bike 100.

The computing device 1130 in various embodiments can be configured for various types of wireless and/or wireless communications, including via Bluetooth, Wi-Fi, a cellular network, the Internet, and the like. The bike 100 can be configured to communicate with devices of a user or rider such as a smartphone, earbuds, headphones, a wearable device, laptop, tablet computer, and the like. Additionally, in various embodiments as discussed in more detail herein, the bike 100 can be configured to communicate with remote systems such as an administrative server, or the like (see, e.g., FIGS. 13a and 13b).

The computing device 1130 can be configured to obtain data from and/or control various elements of the bike 100 including from solar panel assemblies 130, battery 250, motor controllers 1120, and the like. For example, the computing device 1130 can receive data from the solar panel assemblies 130 related to the amount of power being generated, temperature, power generation efficiency, hardware health, and the like. In another example, the computing device 1130 can be powered by the battery 250 and can obtain data from the battery including charge level, battery temperature, battery efficiency, battery health, and the like. Additionally, the computing device 1120 can control the bike 100 via the motor controllers 1120, including configuring an electric power use profile of the motors 220 (e.g., power settings to maximize bike performance, to minimize power use, to balance performance and power use, and the like), configuring a motor output profile (e.g., limiting speed, limiting torque, limiting acceleration, and the like), configuring regenerative braking, and the like.

This example bike 100 should not be construed to be limiting on the wide variety of alternative systems that are within the scope of the disclosure. For example, while the example of FIG. 11 comprises two motors 220A, 220B, further examples can have any suitable number of motors 220 including one, three, four, five, six, seven, eight, and the like. Accordingly, such a system can be configured to accommodate such numbers of motors 220. Similarly, any suitable number of solar panel assemblies 130 can be present on a bike 100 in various suitable locations.

In various embodiments, time domain multiplexing of a boost converter can save on power electronics with multifaceted solar panel assemblies 130. For example, an issue with some solar energy collecting systems is tying all of the solar cells to the voltage of the lowest producing cells or modules. This can be solved in some embodiments by having an individual boost converter or inverter at every cell, or every module, but can cost extra money and can increase weight and size of the system. However, the number of boost converters/inverters 1110 of a system can be minimized in some embodiments by sharing the boost converter 1110 between solar panel assemblies 130 at different voltages in the time domain (e.g., charging with one solar panel assembly 130 while another solar panel assembly 130 fills a capacitor, and vice versa, effectively sharing the cost of the boost converter 1110 (e.g., a DC-DC converter)).

Figure 12:
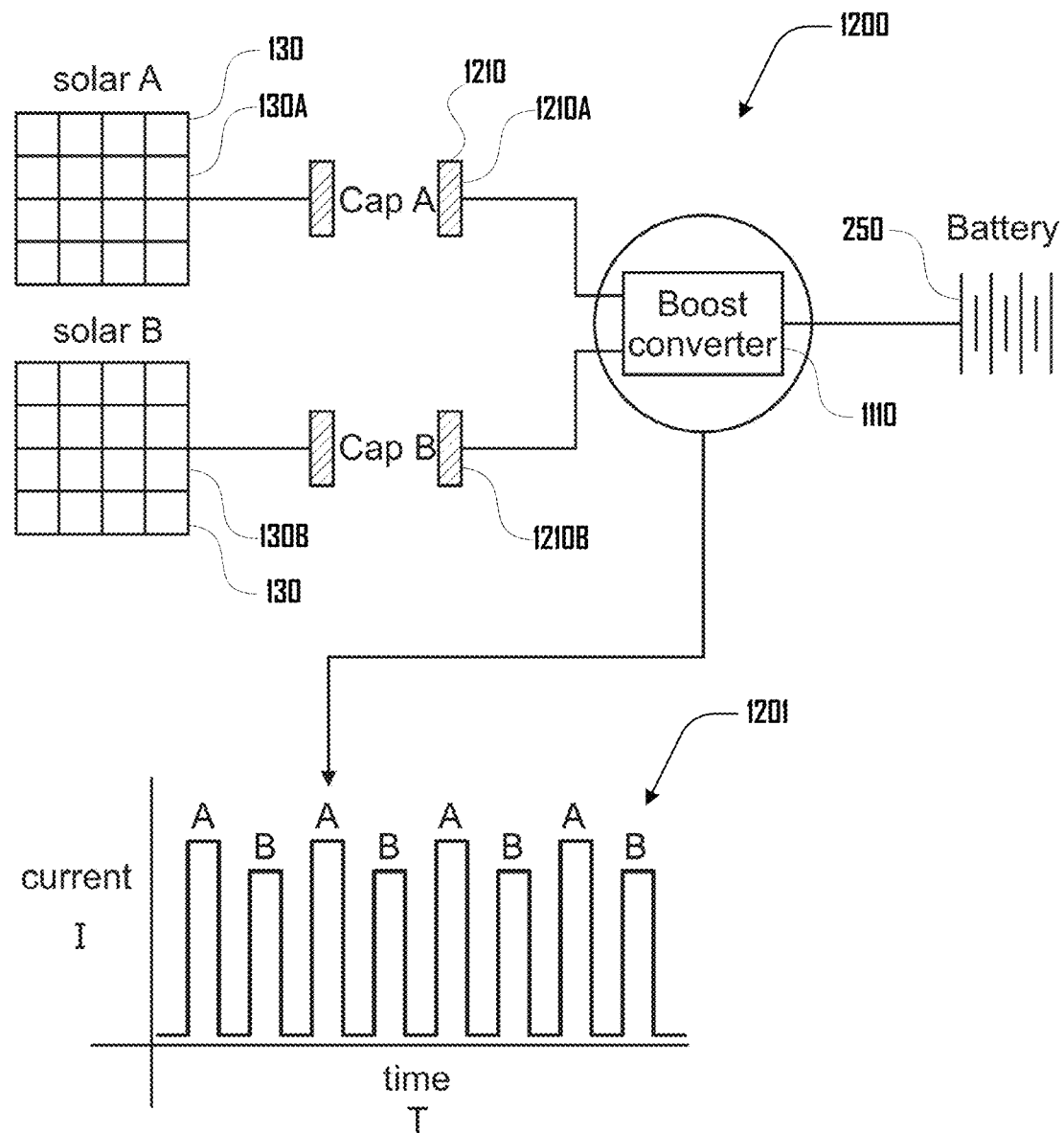
FIG. 12 illustrates an example system that can provide for time-domain charging that comprises a first and second solar panel assembly, which can be operably connected to a boost converted via a respective capacitor.

FIG. 12 illustrates an example system 1200 that can provide for time-domain charging that comprises a first and second solar panel assembly 130A, 130B, which can be operably connected to a boost converter 1110 via a respective capacitor 1210. As shown by the example charging profile 1201 solar panel assemblies 130A, 130B can be alternately used for charging of a battery 250. For example, a first solar panel assembly 130A can be generating greater current than a second solar panel assembly 130B (e.g., due to the second solar panel assembly 130B being smaller and/or receiving less sunlight than the first solar panel assembly 130A).

An alternating charging method can include charging the battery 250 via the first solar panel assembly 130A while the second solar panel assembly 130B charges the second capacitor 1210B. Then, charging can alternate such that the second solar panel assembly 130B charges the battery 250 while the first solar panel assembly 130A charges the first capacitor 1210A. These steps can alternate to provide for alternating charging of the battery.

Such an alternating charging method can be applied to a bike 100 having more than two solar panel assemblies 130. For example, in a bike 100 having three solar panel assemblies 130, charging can alternate between the three solar panel assemblies in the same pattern (e.g., A-B-C-A-B-C-A-B-C, etc.). However, in some embodiments, alternating charging may not be applied in a set pattern and a change in charging can be selected based on characteristics of the respective solar panel assemblies 130 (e.g., the amount of current being generated by a given solar panel assembly 130). Additionally, in some embodiments, solar panel assemblies 130 can charge a battery 250 in set or dynamic groupings. For example, where a bike has four solar panel assemblies 130L, 130R, 130F, 130B of different sizes (see e.g., FIG. 11), alternating charging of the battery 250 can occur in groups (e.g., LF-RB-LF-RB-LF-RB), which may be set by default (e.g., based on anticipated current from the solar panel assemblies) or dynamically based on present current generation conditions, such as some solar panel assemblies 130 being exposed to direct sunlight and others being in shadow or exposed to less sunlight. Groupings can change in terms of number and/or identity. For example, a dynamic alternating charging pattern can be RB-FB-LR-LB-FB-FL-LR-FB. In another example, a dynamic alternating charging pattern can be RBF-LB-FL-R-BLF-RL-FB-FBL-L.

Figure 13A:
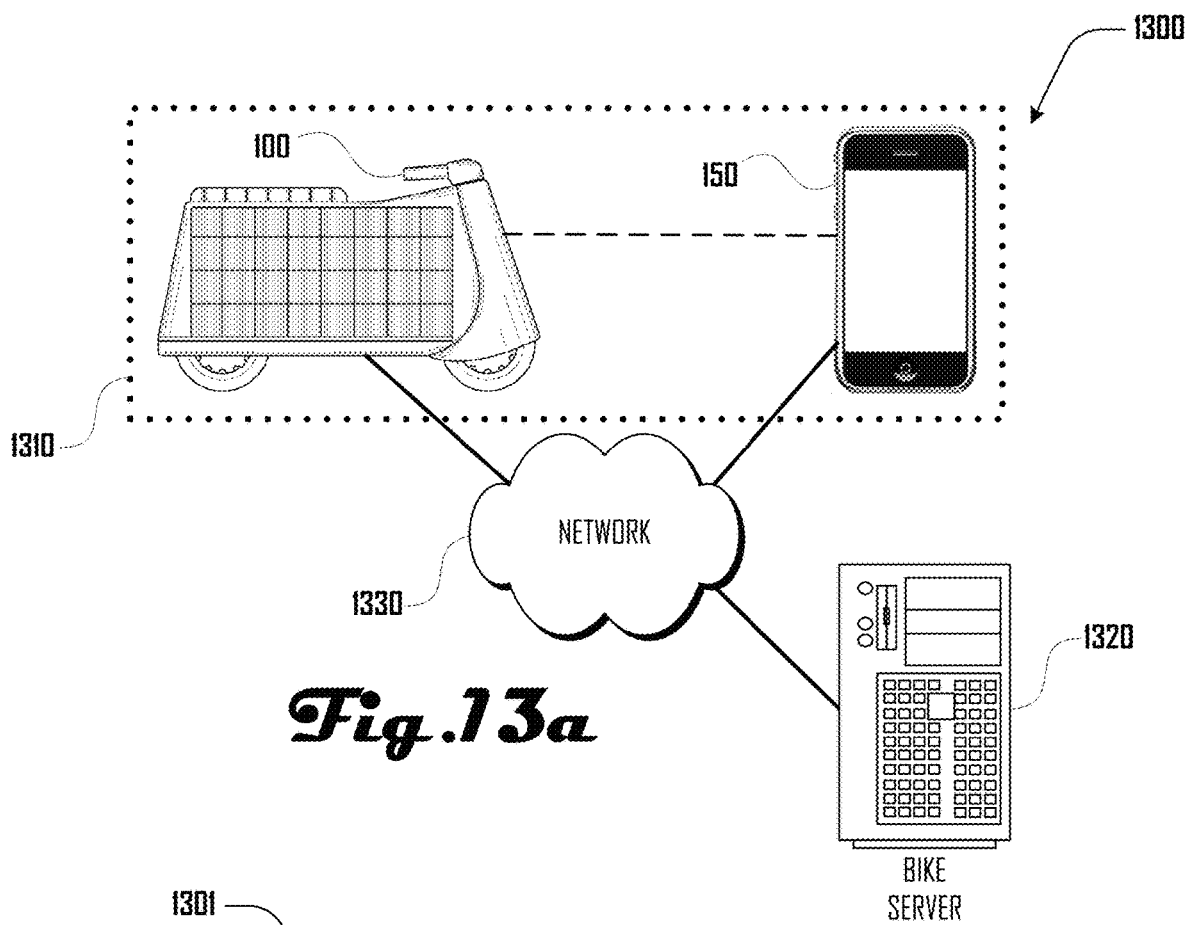
FIG. 13a illustrates a first solar bike network comprising a solar bike and a user interface that define a bike-and-user-device pair, which can be configured to communicate with a bike server via a network.
Figure 13B:
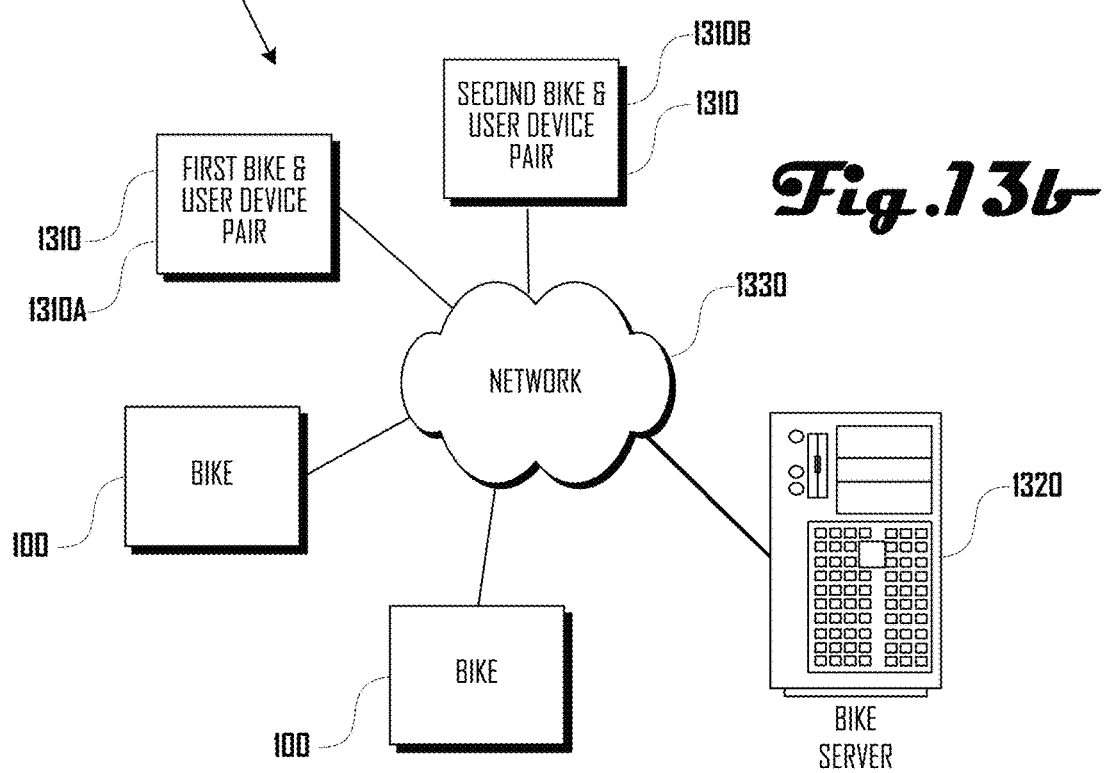

Turning to FIGS. 13a and 13b, examples of solar bike networks 1300, 1301 comprising one or more solar bikes 100 are illustrated. FIG. 13a illustrates a first solar bike network 1300 comprising a solar bike 100 and a user interface 150 that define a bike-and-user-device pair 1310. The bike 100 and user interface 150 can be operable to communicate with each other directly via a local communication network shown as a dashed line and the bike 100 and user interface 150 can be configured to communicate with a bike server 1320 via a network 1330. In some embodiments, the bike 100 and user interface 150 can communicate with each other via the network 1330. In some embodiments, the bike 100 and user interface 150 are inoperable to communicate via a local network connection and instead can only communicate via the network 1330.

As discussed herein, the user interface 150 can be various suitable devices, including a smartphone, tablet computer, smartwatch, wearable device, and the like, and can be configured to communicate with the bike 100 via various suitable local communication channels such as Bluetooth, a wired connection, or the like.

The network 1330 can include various wired and/or wireless networks including a cellular network, the Internet, a Wi-Fi network, a local area network (LAN), a wide-area network (WAN), and the like. The bike server 1320 can comprise one or more virtual or non-virtual computing systems, which can be defined by a distributed computing system or can be located in single location.

While the example of FIG. 13a illustrates an example solar bike network 1300 having a single bike 100 and a single a bike-and-user-device pair 1310, further embodiments can include any suitable plurality of bikes 100 and a bike-and-user-device pairs 1310. For example, FIG. 13b illustrates another solar bike network 1301 comprising a first and second a bike-and-user-device pair 1310A, 1310B and two bikes 100 that are not part of a bike-and-user-device pair 1310. The bike-and-user-device pairs 1310 and the solo bikes 100 can be operably connected to the network 1330 and bike server 1320 as discussed above and shown in FIG. 13a.

Such solar bike networks 1300, 1301 be used for various suitable purposes. For example, a solar bike system comprising a plurality of bikes 100 can be part of a solar bike bike-share system or a solar bike fleet. In such examples, a plurality of solar bikes 100 can be distributed in one or more geographic regions (e.g., one or more campus, city, county, region, country, or the like) and a plurality of users can access and ride the bikes 100. In various examples, users can pick up and check out a bike 100 with their smartphone (i.e., a user interface 150), ride the bike to a destination where the user can leave the bike and check in the bike via their smartphone so that the bike can be used by other users or possibly by the same user at a later time.

A user can generate a bike-and-user-device pair 1310, when the user checks out a bike 100 and this bike-and-user-device pair 1310 can persist while the user rides the bike 100 and until the bike 100 is checked in by the user. Accordingly, referring to the example solar bike network 1301 of FIG. 13, the first and second bike-and-user-device pairs 1310A, 1310B can includes bikes being ridden by a user or that are otherwise checked out by a user. The bikes 100 of the solar bike network 1301 that are not part of a bike-and-user-device pair 1310 can include bikes that are available for riding by a user that are not yet checked out to define a bike-and-user-device pair 1310. Such a bike-share system or a solar bike fleet can be used by the general public or by members of a specific group such as a company, university, government department, or the like.

A solar bike network 1300, 1301 can provide for various desirable functionalities including configuration of one or more bike 100 based on location of the bike 100. For example, in various embodiments, allowable speed and/or power limits can be locked or unlocked based on the determined location of the bike 100 and/or user interface 150 of a bike-and-user-device pair 1310 and based on laws that govern use of a bike 100 in the determined location.

For example, a GPS module of a bike 100 and/or user interface 150 can be interrogated for its position and correlated with local laws including whether the bike 100 is in a bicycle lane, footpath, or roadway. The bike 100 can be restricted to low speed (walking speed) operation, for example, when it mounts the footpath, and return to full-speed full-power operation once it is once again on a roadway.

Figure 14:
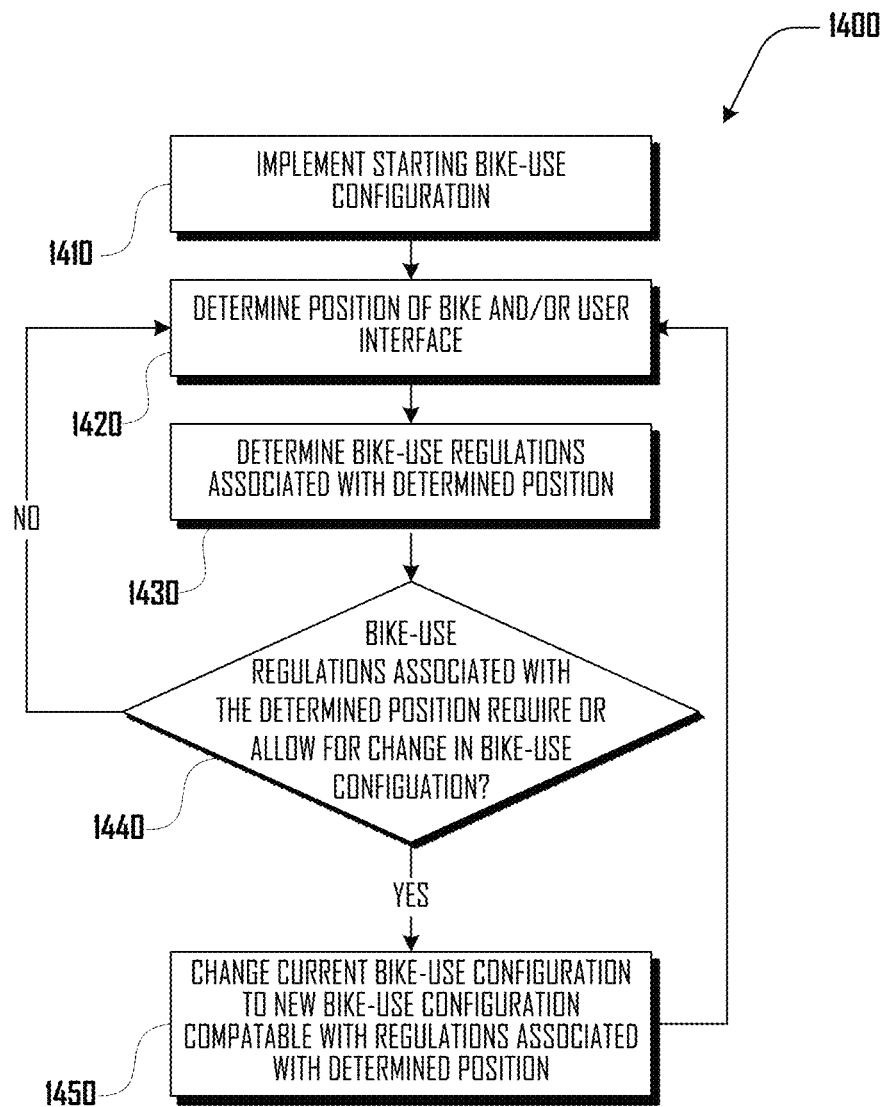
FIG. 14 illustrates an example of a method for changing a bike-use configuration based on location.

FIG. 14 illustrates an example of a method 1400 for changing a bike-use configuration based on location. In some embodiments, such a method 1400 can be performed in whole by a bike server 1320, user interface 150, or other suitable device. The method 1400 begins at 1410 where a starting bike-use configuration is implemented. In various embodiments, such a starting bike-use configuration can be a default bike-use configuration, a recently used bike-use configuration, or the like. For example, where a new user is checking out a bike 100, the bike-use configuration of the last user can be implemented as a starting bike-use configuration.

Returning to the method 1400, at 1420, the position of the bike 100 and/or the user interface 150 are determined. For example, the bike 100 and/or the user interface 150 can use a respective GPS unit to report a position. In some embodiments, a respective reported position by the bike 100 and the user interface 150 can be averaged, combined, or otherwise used to generate a determined position of the bike 100. Alternatively, a position reported by only one of the bike 100 or the user interface 150 can be used to generate a determined position of the bike 100.

A set of bike-use regulations associated with determined position of the bike 100 can be determined, including local, state and/or federal laws, related to general or specific locations, and the like. For example, where a determined position is in the United States in the state of California, a bike-use regulation can include a maximum speed limit defined by federal or state law. In another example, where the determined position is on a portion of Alabama Street in San Francisco, a bike-use regulation associated with such a position can be the maximum speed limit on that portion of Alabama Street. In a further example, where the determined position is on a portion of sidewalk adjacent to Alabama Street in San Francisco, a bike-use regulation associated with such a position can be the maximum speed limit on that portion of the sidewalk or whether the bike 100 is allowed to be ridden on the sidewalk.

Returning to the method 1400, at 1440, a determination is made whether the bike-use regulations associated with the determined position of the bike require or allow for a change in the current bike-use configuration, and if so, at 1450, the current bike-use configuration is changed to a new bike-use configuration that is compatible with the set of regulations associated with the determined position of the bike 100 and the method 1400 cycles back to 1420, where the position of the bike and/or user interface are determined. However, if a change is not required or possible, then the method 1400 cycles back to 1420, where the position of the bike and/or user interface are determined.

For example, where the bike 100 is operating with a current bike-use configuration that limits the bike to a maximum speed of 25 miles per hour (mph) and the bike 100 is determined to be (or about to be) operating on a street having a speed limit of 45 mph, it can be determined that the current bike-use configuration can be allowed to change to a bike-use configuration that limits the bike to a maximum speed of 30 mph, 35 mph, 40 mph, 45 mph, 50 mph, or the like. In another example, where the bike 100 is operating with a current bike-use configuration that limits the bike to a maximum speed of 45 mph and the bike 100 is determined to be (or about to be) operating on a street having a speed limit of 25 mph, it can be determined that the current bike-use configuration should be changed to a bike-use configuration that limits the bike to a maximum speed of 20 mph, 25 mph, 30 mph, or the like. In a further example, where the bike 100 is operating with a current bike-use configuration that limits the bike to a maximum speed of 25 mph and the bike 100 is determined to be (or about to be) present in a location where operating the bike would not be allowed (e.g., on a sidewalk, in a park, in a designated restricted area, or the like), it can be determined that the current bike-use configuration of the bike 100 should be changed to a bike-use configuration that requires the user to walk the bike 100 instead of ride the bike 100, that limits the maximum speed to 1 mph, 2 mph, 3 mph, 4 mph, 5 mph, or the like.

Figure 15A:
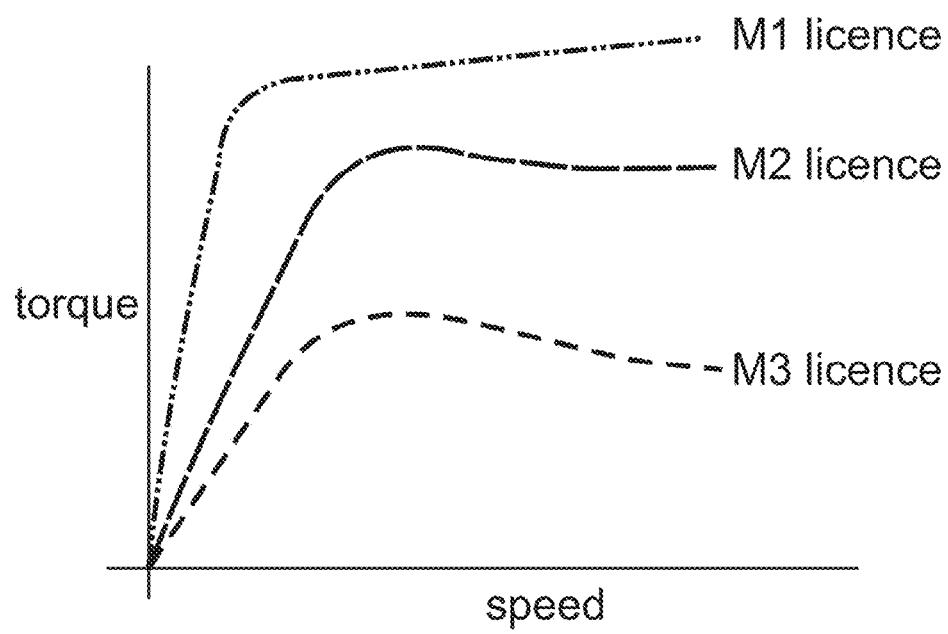
FIGS. 15a and 15b illustrate graphs of examples of different bike-use configuration settings based on a user having no license, an M1 motorcycle license or an M2 motorcycle license.
Figure 15B:
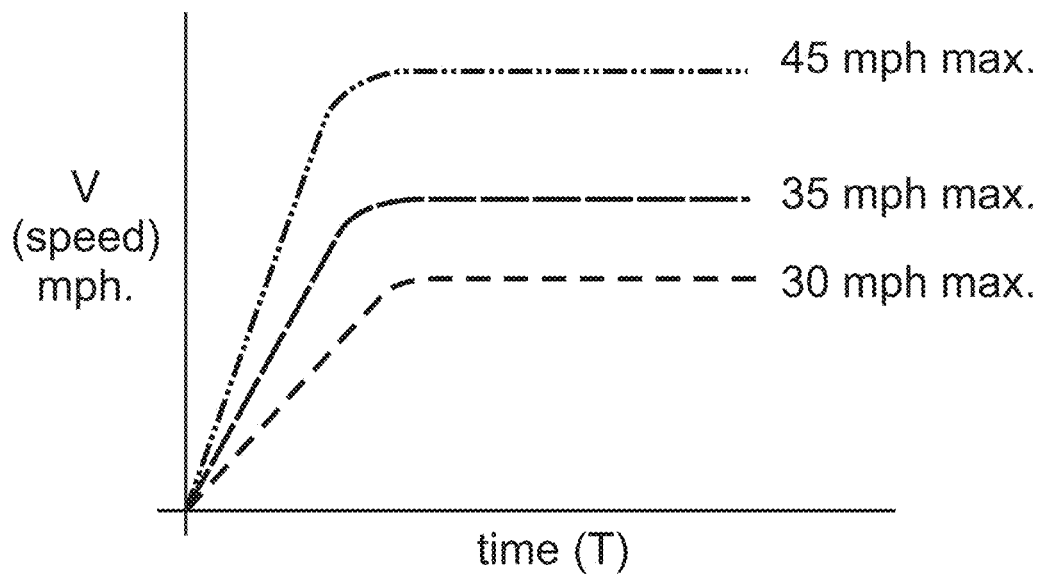

Settings of a bike-use configuration can be determined based on various suitable factors including based on a license held or not held by the user. FIGS. 15*a* and 15*b* illustrate examples of different bike-use configuration setting based on a user having no license, an M1 motorcycle license or an M2 motorcycle license. For example, a rider with no license or proof of license may be restricted to under 20 mph travel as per electric bicycle and skateboard laws, whereas if the rider presents with an M1 motorcycle license, the rider could access greater or maximum power and speed of a bike 100. In various embodiments, such settings can include maximum speed, maximum torque, location restrictions (e.g., not allowed on highways) or other suitable configurations of a bike.

In various embodiments, users can verify that they have a certain license (e.g., driver's license, M1 license, M2 license, or the like) and settings of a bike-use configuration can be determined and set accordingly. Such a verification can include submitting a license number and/or image of a license to a bike server 1320 and can include verification of a user's identity. For example, a user can provide an image of an M2 license (e.g., via a camera of the bike 100 and/or user interface 150) and computer vision can be used to identify the license number in the image and a picture of the license holder in the image.

Validity of the license can be confirmed via the license number or other suitable method. Additionally, identity of a given user can be identified to confirm that the user pictured and named on the provided license image is the same user operating the bike 100 and/or associated with a user interface 150 associated with the bike 100. For example, an image of a user (e.g., the user's face) can be captured (e.g., via a camera of the bike 100 and/or user interface 150) and compared to the image of the user of the M2 license to determine whether the same user is present in both images. If so, a bike 100 can be provisioned with a bike-use configuration based on the user holding a valid M2 license and being associated with the bike 100.

In some examples, users may be required to validate their identity (e.g., via a face scan) each time the user checks out a bike 100; or validity of the M2 license can be associated with a specific user interface 150 (e.g., a specific smart phone of a user) for a limited or extended period of time, such that when the user interface 150 is paired with a bike 100 (e.g., of a bike network 1301), such a bike 100 can be configured based on the user holding a valid M2 license based on the identity of the user interface 150 and the association of a valid M2 license with the user interface 150.

In some embodiments, the bike 100 can comprise a remote interlock that enables the bike 100 to be unlocked, ridden or enabled with an advanced bike-use configuration (e.g., allowing higher speeds, power or torques), only if it can be confirmed that the rider is wearing a road-rule-based, legal and compliant helmet. For example, such a remote interlock can be triggered in some embodiments through a vision system that identifies a helmet with an identifier on the helmet such as a QR code, via an RFID tag or other electric signal from the helmet to the bike 100 or vice versa, and the like. For example, FIG. 19 illustrates an example embodiment of a helmet 230 configured to interact with a bike 100 wirelessly, which can provide for unlocking or setting a bike-use configuration of the bike 100.

Determining and implementing a given bike-use configuration can be based on various suitable factors including, time, weather, lighting conditions, user history, user weight, load on a bike, or the like. For example, during nighttime, inclement weather or in low lighting conditions, setting such as maximum speed or maximum torque can be limited. Such a limit can be a limit for all users regardless of license or the like (e.g., the bike 100 is limited to 35 mph regardless of license held by the user) or can be a reduction from a baseline (e.g., maximum speed is reduced by 20% from the maximum speed that would normally be allowed to the user).

In various embodiments, a reported user weight and/or sensors of the bike 100 can be used to infer rider size and/or load weight and a bike-use configuration can be determined and implemented based on such information (e.g., configure a bike 100 for greater torque for heavier users or where heavy loads are being carried on the bike 100). Such sensors can include a torque sensor, inclinometer, pressure sensor, load cell, or the like. In some embodiments, torque may be estimated by acceleration and power profiles and rider weight and/or load weight can be estimated from these profiles. Adjusting power, torque and the like available according to rider weight can be desirable to enable small or light users to have the same experience as heavy or large users.

In some embodiments, where a user has a history of unsafe riding or other undesirable user activity, maximum speed, torque, or other setting can be limited or changed (e.g., unsafe riders can have their maximum speed and torque reduced by 20% from the maximum speed and torque that would normally be allowed to safe users). For example, users can have a safety or ability rating associated with a user account, and when checking out a bike 100 for use, such a rating can be used to determine a bike-use configuration for the bike being checked out to the user. Such a rating can be based on various suitable factors, including speed and acceleration data from previous bike uses indicating unsafe activity (e.g., data from a bike 100 and/or user interface 150); reports of accidents or infractions during use of a bike 100 or other vehicle; reports from other users of a bike network 1301; reports of damage to bikes previously checked out to the user and attributed to the user, and the like. In some embodiments, users may be informed that their bike 100 is being provisioned with reduced functionality based on such a user rating, or provisioning of reduced functionality based on user rating can be obscured from users such that they are unaware.

Various embodiments can include suggesting a parking location and/or orientation of a bike 100 to maximize exposure to the sun while the bike 100 is parked to maximize solar charging via one or more solar panel assemblies 130 of the bike 100. In various embodiments, the location and/or orientation of a bike 100 can be determined based on one or more sensors of the bike 100 and/or a user interface 150. For example, sensor fusion can be used to incorporate GPS, magnetometer, inclinometer, and other sensor data including the voltages of the solar panels assemblies 130 themselves and historical maps of solar resource at that particular location, to provide the user electronic or other suitable prompts regarding the best position and/or orientation to park the bike 100 in.

Recommendations for desirable locations and orientations to park the bike 100 based on the amount of solar exposure in a given location can be determined based on various suitable factors including expected amount of time that the bike 100 will be parked in the location; time of day; current and/or future position of the sun; presence of buildings, topography, trees or other structures that might block the sun; historical charging or image data obtained from one or more bikes 100 of a bike network; current and/or forecast weather; and the like. For example, where a bike 100 is being parked in an area with tall buildings that could block the sun, suitable parking locations can be identified where shadows are not currently being cast by such building and where shadows are not expected to be present (or minimal compared to other locations) over a period of time when the bike 100 is expected to be parked in the location.

In various embodiments, sun charts indicating the position of the sun over the period of time when the bike 100 is expected to be parked in the location can be compared to maps identifying the location and volume of buildings nearby (e.g., identifying the structure of the buildings such as height and width in various areas), and such information can be used to generate a projection of where shadows currently are or are not present along with a projection of movement of shadows over time based on movement of the sun over time. Accordingly, parking locations can be identified where maximum projected charging will likely occur based on a change in shadows over a time period that the bike 100 is expected to be parked in that location. For example, in some cases a user can receive a suggestion to park a bike 100 in a location that is currently in a shadow because that location is projected to receive a large amount of sunlight over a time period that the bike 100 is expected to be parked in that location, even though charging may be initially low due to the location currently being in shadow.

A desirable parking orientation for a bike 100 can be determined in various suitable ways. For example, the location(s) of one or more solar panel assemblies 130 on a bike 100 can be known and a desirable orientation can be identified based on the angle of the sun being perpendicular or at other suitable angle to the one or more solar panel assemblies 130 on the bike 100, which is projected to provide maximum charging over time. Such a determination may be based on the relative size, and maximum current output by respective solar panel assemblies 130 on a bike 100. A suggested orientation can be based on projected maximum charging over a period of time. Accordingly, in some examples, a suggested orientation may not currently be an optimal charging orientation or location but is projected to provide maximum charging over a determined period of time. For example, a user could receive a suggestion for parking a bike in shadow and/or at an angle that does not correspond to the current angle of the sun, but such a location and orientation is still projected to provide maximum charging over the time period (e.g., a bike can be parked in shadow and/or at an orientation during midday while the sun is directly over the bike and would provide poor charging due to the angle of the sun relative to solar panel assemblies 130, but later in the day, the location would be in full sun and the sun would be at a more desirable angle to the solar panel assemblies 130 that would provide maximum charging).

Suggested orientation of a bike 100 can include direction that the bike 100 is facing (e.g., north, south, east, and west) and can include tilt of the bike 100. For example, where bikes 100 comprise a kickstand (e.g., kickstand 320 in FIGS. 3, 18a and 18b) or can be leaned against an object, a suggested parking orientation can include a tilt angle (e.g., 15 degrees from perpendicular to the ground and tilted east). For example, in some embodiments a bike 100 can have a kickstand 320 or other element that provides for different angles of lean, and a user can receive a suggestion for an optimal lean setting for the bike 100 from a plurality of lean settings available. However, as discussed herein, in some embodiments, location, tilt and/or direction that the bike 100 is facing can be automated.

A time period that a bike 100 is expected to be parked in various locations can be determined in various suitable ways. In some embodiments, historical data regarding use of one or more bikes 100 in a network (e.g., networks 1300, 1301) can be used to identify use patterns of a group of bikes 100 in a broad or narrow location area, or use patterns of specific bikes in a broad or narrow location area. For example, in locations where users commute to work via bikes 100, park them during the day, and then return home on the bikes after work, a determined time period that a bike 100 is expected to be parked in such an area may be higher (e.g., for several hours during the work day) compared to locations where tourists or other users are frequently checking out and riding bikes for recreation. Additionally, bikes used for commuting or campus travel may have different user patterns on weekdays compared to weekends or holidays. For example, bikes 100 in one area may be expected to remain parked for long periods of time over weekends or holidays in some locations, whereas bikes in another area may be expected to be parked for shorter periods during weekends or holidays due to more tourists or locals using the bikes for recreation in such an area.

Similarly, user patterns of a given user can be used to determine a time period that a bike 100 is expected to be parked in a given location. For example, where a user often uses the same bike 100 or bikes within a certain area frequently, use patterns of this specific user can be used to estimate a time that a specific bike 100 or bikes within a given area are likely to be parked. In one example, where a user typically rides a bike 100 during the week to make deliveries, a determination can be made that the bike will be parked for a short period of time while deliveries are being made, so suggesting parking in a currently sunny location may be prioritized over locations that are not currently sunny but would experience more sun over an extended period of time. Similarly, where a given user commutes to work on one or more bike 100 from a bike network (e.g., networks 1300, 1301), when a user returns home from work on a bike 100, a determination can be made that the bike 100 will remain parked overnight until the following morning when the user will commute back to work or that the bike will remain parked over the weekend until the commuter returns to work on Monday. Such estimated parking times may also be based on location. For example, where the user commutes home to a location where fewer other users are likely to use the bike, an estimated parking time may be longer compared to a location where there are many other bike users.

While some examples above relate to parking suggestions for users that check out and ride bikes 100, further embodiments can relate to administrators who are moving or placing bikes 100 in a bike network (e.g., networks 1300, 1301). For example, in some embodiments, administrators can receive an alert indicating that one or more bikes 100 is in an undesirable location and that the one or more bikes 100 should be moved to a new location; that such one or more bikes are eligible to be moved to a new location; that such one or more bikes should be prioritized or incentivized for moving by users, or the like. Similarly, where bike administrators are moving, placing or otherwise distributing bikes 100, such administrators can receive recommendations for desirable parking locations and/or orientations based on sun exposure over a time period.

Additionally, while various examples discussed herein relate to suggestions for parking a bike 100, in some embodiments, a user can receive routing suggestions for optimal charging of the bike 100 during use. For example, a user interface 150 can present routing information to a user and routes that are determined to be in direct sunlight can be prioritized over routes that have less or reduced sunlight exposure (e.g., routes through tunnels; in areas with buildings casting shadows on the route; in areas where topography such as hills or mountains that cast shadows on the route, and the like). Such routing selection and suggestions can use factors discussed herein related to generating suggestions for parking, which can further include determining an estimated sun exposure on a plurality of different routes and selecting a route from the plurality of routes for suggestion or prioritization based at least in part on greater estimated sun exposure or charging. For example, in some embodiments, a route may be suggested that is longer than another route because the longer route is expected to provide better sun exposure or charging compared to a shorter route.

In further embodiments, routing can be based on the charge state of one or more bikes in a bike network (e.g., networks 1300, 1301). For example, in a network comprising a plurality of bikes 100, the charge state of bikes 100 in network and can predict a future charge state of parked bikes in network. Where a bike 100 that is being ridden or checked out does not have an ideal charge state to complete a given journey, routing of the journey can include routing to the location of one or more additional bikes 100.

In some embodiments, weight on a bike 100 such as rider and/or load weight can be used to determine and/or adjust mileage estimates, and the like. In various examples, torque and inclinometer sensors can allow bike to infer rider size and load weight, and torque may be estimated by acceleration and power profiles measured by a central computer of the bike 100 or user interface 150. Rider weight and/or load weight can be estimated from these profiles in some examples and the bike 100 can adjust power available and/or torque available according to rider weight, which can enable small or light users to have the same experience as heavy or large users.

For example, a method of routing can include a user defining a destination (e.g., via a user interface 150 such as a smartphone) and a bike server 1320 can determine whether any bikes 100 within the vicinity of the user have a charge state that is suitable for the journey to the defined destination, which in some embodiments can include anticipated charging while traveling. If so, the user can be directed to the one or more suitable bikes 100. For example, if a user is at a bike 100 that is not suitable, the user may be re-directed or alerted to a bike 100 in the vicinity of the user that is suitable.

However, if no bikes 100 within the vicinity of the user are suitable to convey the user to the defined destination, then a determination can be made whether there is a suitable route possible via use of a plurality of bikes 100. For example a determination can be made whether a bike 100 within the vicinity of the user has a charge state sufficient to convey the user to a second bike 100 that can convey the user to the defined destination or to a third bike 100 that can convey the user to the defined destination or to a fourth bike 100, etc. In various embodiments, determining whether bikes along a route have a suitable charge state can include anticipated charging while traveling and/or charging during the time when the user is traveling to the bike (e.g., walking to a first bike, riding to a second bike, and the like). In some embodiments, where a user accepts a route having a plurality of bikes 100, some or all of the bikes 100 can be reserved for the user such that the reserved bikes are unavailable for checkout by other users so that the bike(s) 100 will be available when the user arrives.

One or more suggested routes, parking locations and/or orientation for the bike 100 can be presented to a user via a user interface 150, bike 100 or other suitable method. For example, FIG. 16 illustrates an example embodiment of a parking suggestion display 1600 that in this example includes a map 1610 having a plurality of streets 1620, suggested parking locations 1630 and current bike location indicator 1640.

The suggested parking locations 1630 are shown as hatching on the map 1610 in the example of FIG. 16; however, suggested parking locations 1630 can be illustrated in various suitable ways, including shading, coloring, boxing, highlighting, or other suitable indication. The suggested parking locations 1630 can be presented in the same way or differently on the map 1610. For example, in some embodiments, suggested parking locations 1630 can be color coded based on solar charging quality of a given suggested parking location 1630. For example, locations 1630 that are expected to provide high-quality maximum charging of a bike 100 can be illustrated in green; locations 1630 that are expected to provide medium-quality charging can be shown in orange; locations 1630 that are expected to provide low-quality charging can be shown in red; and locations 1630 that are expected to provide no charging or unacceptably-low charging can be shown in black.

Figure 17:
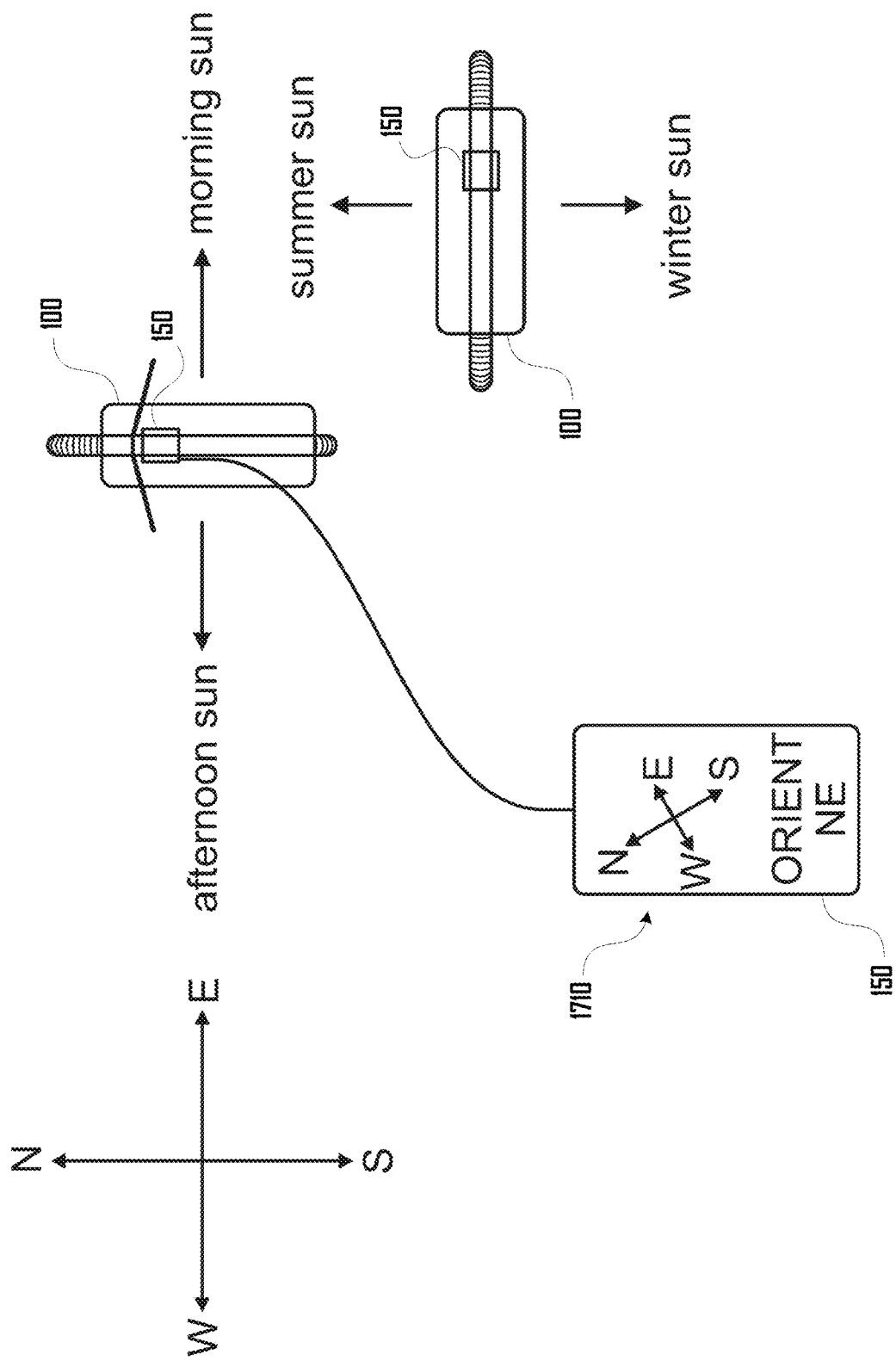
FIG. 17 illustrates an example of a display that can be presented on a user interface that can provide directions and/or suggestions on how to orient a bike to maximize solar charging via one or more solar panel assemblies of the bike.

FIG. 17 illustrates an example of a display 1710 that can be presented on a user interface 150 that can provide directions and/or suggestions on how to orient a bike 100 to maximize solar charging via one or more solar panel assemblies 130 of the bike 100. The example of FIG. 17 shows a display 1710 having cardinal directions, but various embodiments can have any suitable indicators or suggestions for orienting or changing the orientation of the bike 100, such as a pointer of a direction to rotate the bike 100, an indication to rotate the bike a given direction and amount (e.g., rotate the bike left 45 degrees to be facing west), and the like. Additionally, as discussed herein, a user can receive a suggestion for tilting the bike 100 at a desirable angle, either via an element such as a kickstand 320, leaning the bike 100 against something, or the like.

Figure 18A:
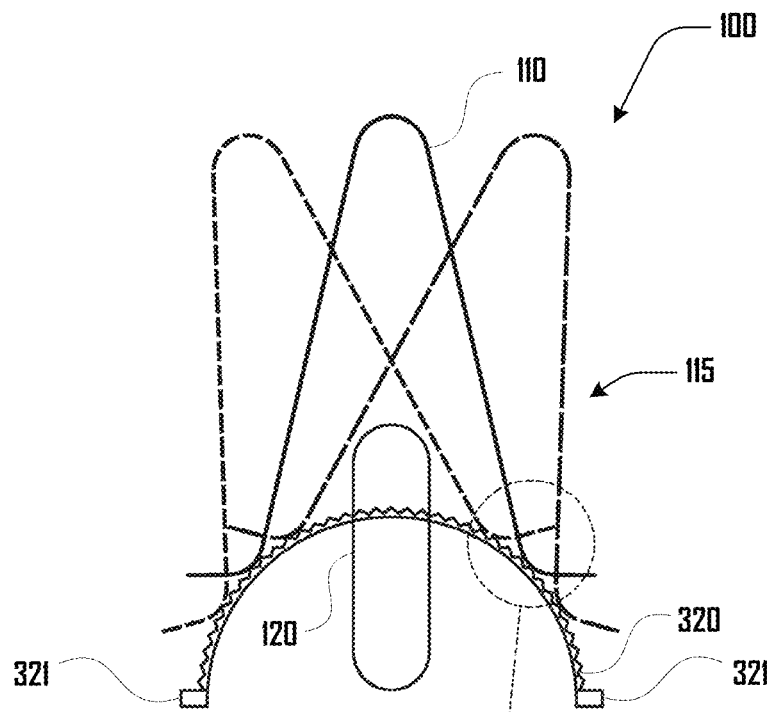
FIGS. 18a and 18b illustrate an example embodiment of a kickstand that provides for adjusting the angle of a parked bike where
Figure 18B:
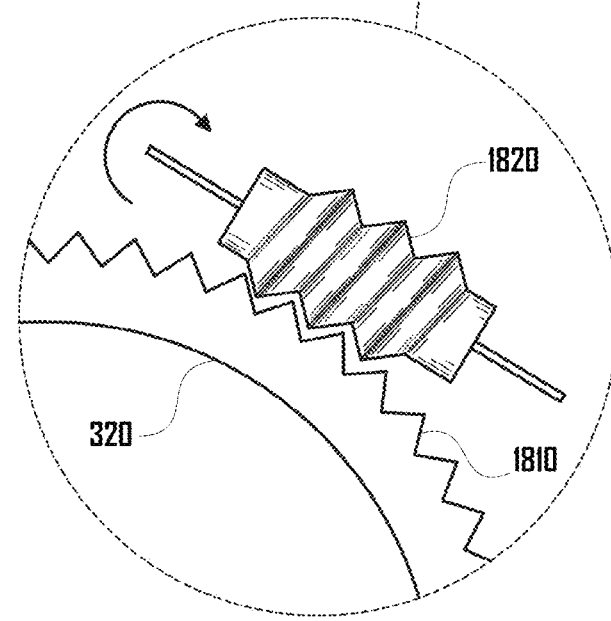

For example, FIGS. 18a and 18b illustrate an example embodiment of a kickstand 320 that provides for adjusting the angle of a parked bike 100. FIG. 18a illustrates an example of an arced kickstand 320 defining a pair of legs 321 that extend from opposing sides 115 of the body 110 of the bike 100 with the legs 321 configured to engage the ground and hold the bike 100 upright including at various angles. As shown in the close-up view of the example kickstand 320 of FIG. 18b, the arced kickstand 320 can include a plurality of gear teeth 1810 that can engage a worm drive 1820 that can rotate to adjust the angle that the bike 100 is held at as shown in FIG. 18a. Further embodiments can comprise four-bar linkages, a linkage that includes a lead screw, or any other suitable mechanism. The kickstand 320 can be configured to be deployed for parking so the legs 321 engage the ground and can be configured to be stowed for riding or otherwise moving the bike 100.

In some embodiments, a kickstand 320 can be configured to move the bike 100 to automatically track the position and/or angle of the sun or can be set by a user parking the bike, which may be based on a suggested parking angle as discussed herein. Automatic tracking or suggested angle can be based on data including motions of the sun from a time-based look-up table; local data gathered by a network of one or more bikes, variable voltages between solar panel arrays 130 at different orientations of the bike 130, light sensors of the bike 100, a magnetometer, an inclinometer, and the like.

One example method of automatically adjusting a bike 100 can include determining an ideal bike angle; determining whether the bike 100 is within a tolerance range of that ideal angle; and if not, changing the angle of the bike 100 to match the ideal angle or within a tolerance range of the ideal angle. Such a method can be repeated periodically so that the angle of the bike 100 tracks the sun over time to provide maximum charging of the bike 100 via one or more solar panel assemblies 130.

As discussed herein, in some embodiments, a bike network (e.g., networks 1300, 1301) can implement a user rating that uses characteristics of use by a user, including acceleration-deceleration, average speeds, bike parking placement, and the like to determine whether the customer is exhibiting characteristics of being a safe driver, complying with rules and laws, maximizing the charge state of bikes 100 within a bike network, damage caused to bikes within a network 100, being a good citizen within the bike network or community, and the like. Additionally, in some embodiments, a bike network can implement an incentive program or gamify behavior based on such a user rating, which can be a benefit for increasing the overall charge state of the bikes 100 in the network; reducing damage or unnecessary wear on the bikes 100; reducing fines imposed on the bike network by local, regional or federal jurisdictions; reducing negative public relations related to the bike network; reducing potential liability for the bike network; reducing operating cost of the bike network, and the like.

In various embodiments, users can receive rewards or punishments based on such a user rating. For example, it can be desirable to incentivize users to park bikes 100 to maximize exposure to the sun to maximize charging of the bike, so users who follow instructions regarding parking location and parking orientation can receive rewards, whereas users who do not may not receive rewards or receive punishments. In addition to applying to a user parking a bike 100 during check-in of a bike 100, in some embodiments, users can receive alerts to move nearby bikes 100 to correct or improve the charging potential of such bikes and can receive rewards for such assistance. For example, where sunlight conditions have changed or a previous user incorrectly parked a bike, other users in the area can receive an alert that provides a "bounty" or other reward for correcting the parking location and/or orientation of such a bike 100. Accordingly, users of a bike network can be incentivized to care for and improve the state of the bike network while actively using bikes 100 of the bike network or while in proximity to bikes in the bike network 100. Similarly, in some embodiments, the user can receive an alert that provides a "bounty" or other reward for correcting the parking location and/or orientation of such a bike, such as where the bike 100 has been tipped over, or parked or moved to a location that is illegal or improper for parking the bike 100.

Rewards and/or punishments can be of various suitable types. For example, users with higher user ratings can receive or unlock benefits such as reduced-cost of rides, reduced membership fees, bike reservations, ride cancelation flexibility, coupons, ability to reserve bikes 100, increased maximum bike-checkout time, and the like. In another example, users with higher rating can receive or unlock advanced bike-use configurations such as greater top speed, greater top torque, greater top acceleration, access to storage compartments, access to charging ports, and the like.

Bikes 100 can have various suitable forms in further embodiments. For example, FIGS. 21a, 21b, 22, 23, 24, 25, 26a, 26b, 27, 28 and 29 illustrate bikes 100 of various example embodiments.

Figure 20:
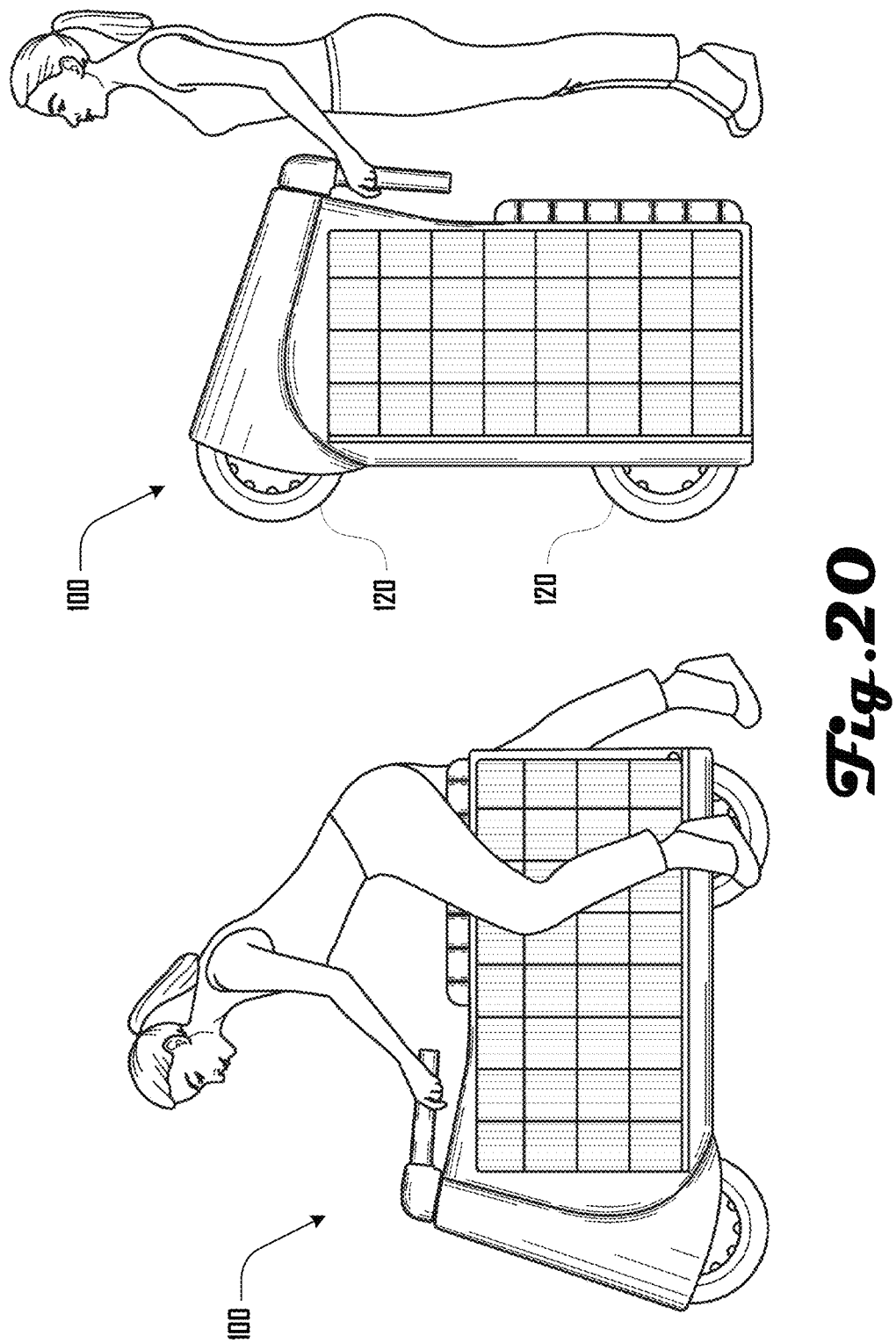
FIG. 20 illustrates an example of a bike being rotated from a riding configuration to a standing configuration.
Figure 21A:
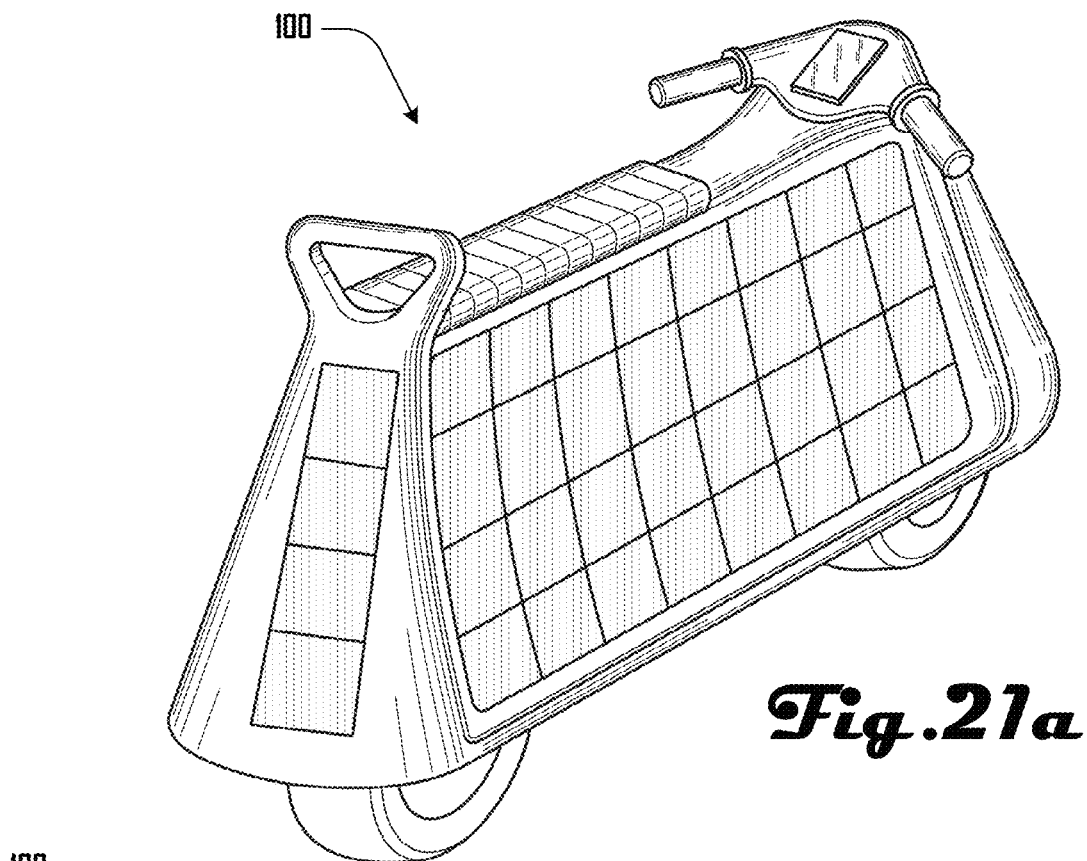
FIG. 21a illustrates a perspective view of a bike in accordance with an embodiment.
Figure 21B:
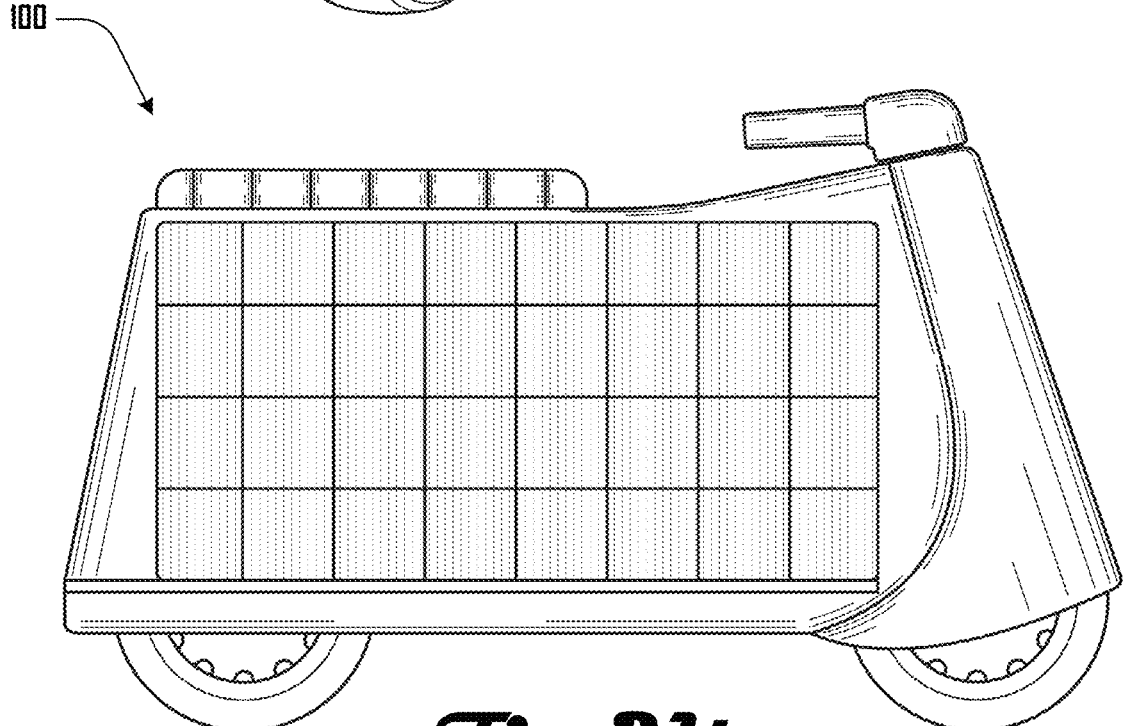
FIG. 21b illustrates a side view of a bike in accordance with another embodiment.
Figure 22:
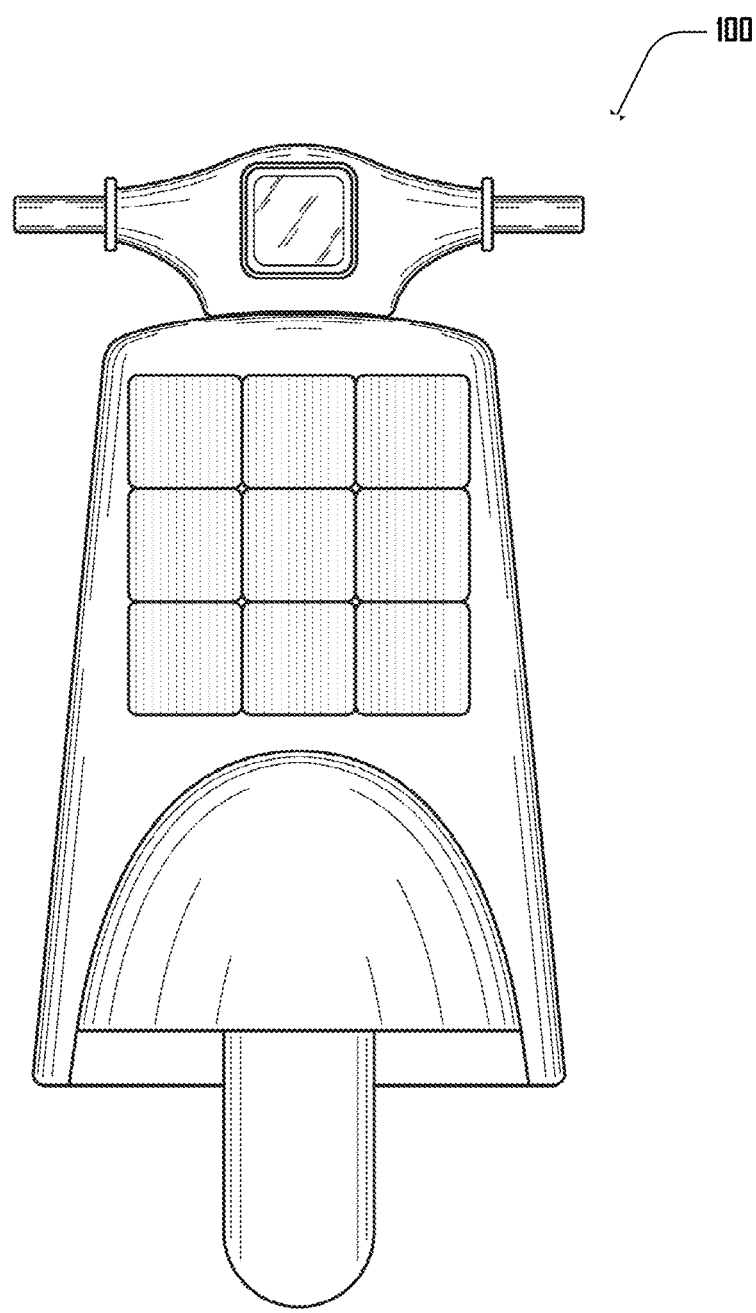
FIG. 22 illustrates a side view of a bike in accordance with a further embodiment.
Figure 23:
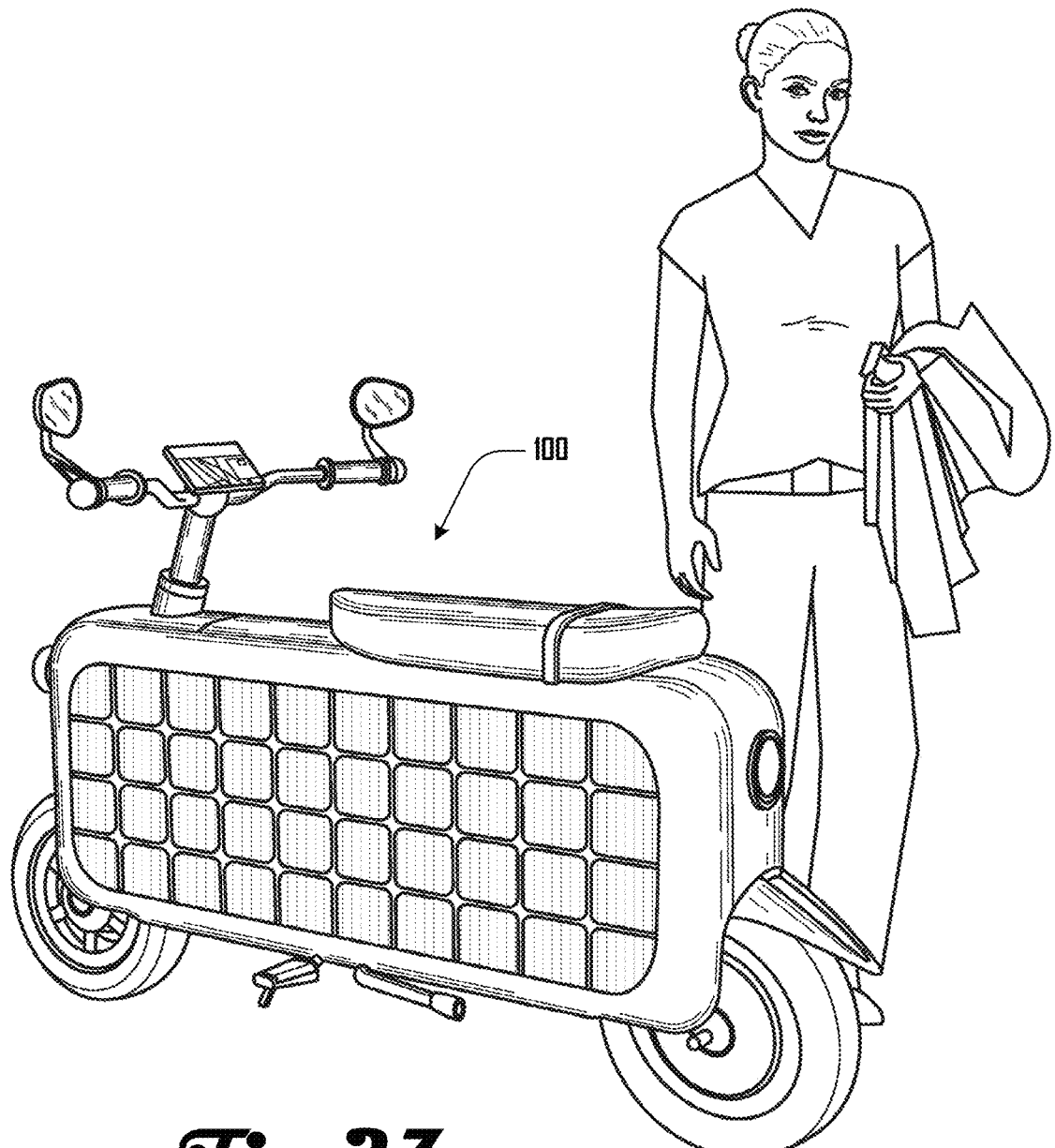
FIG. 23 illustrates a perspective view of a bike and a user in accordance with a still further embodiment.
Figure 26A:
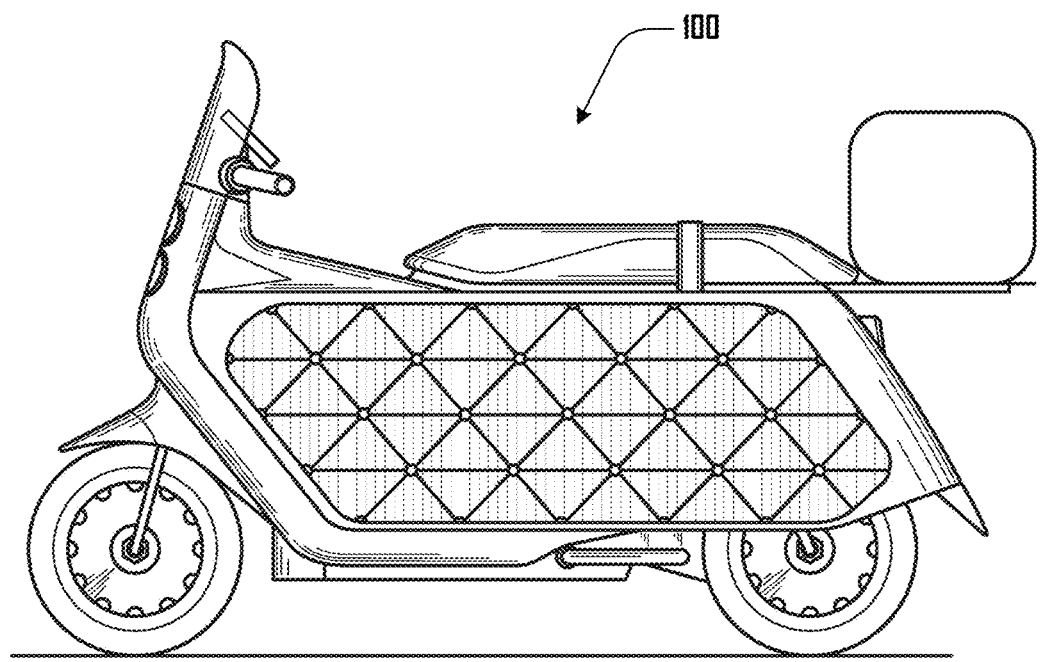
FIG. 26a illustrates a side view of a bike in accordance with a further embodiment.
Figure 26B:
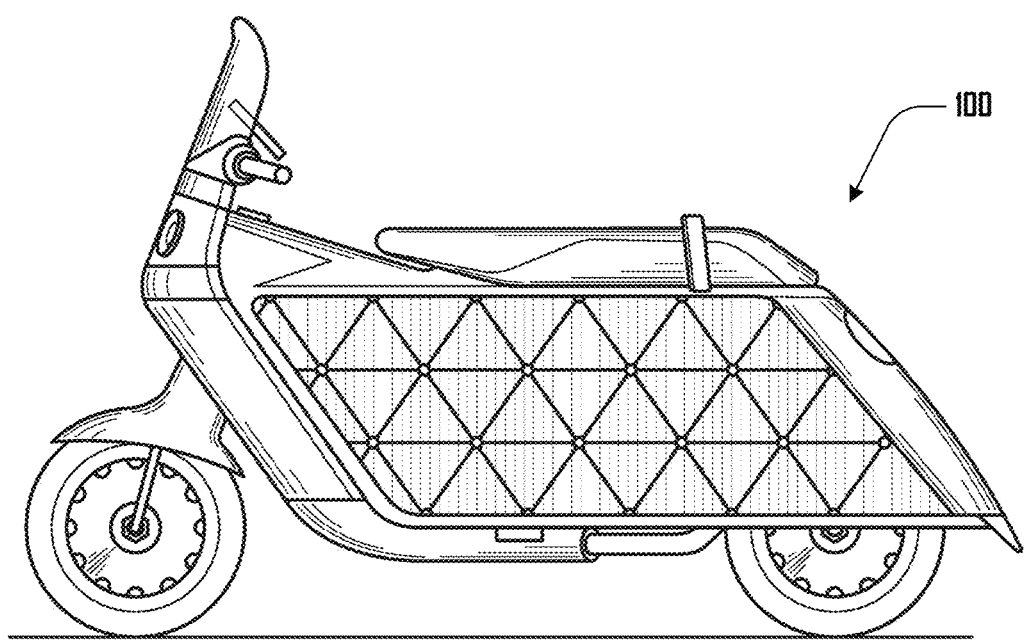
FIG. 26b illustrates a side view of a bike in accordance with a still further embodiment.
Figure 27:
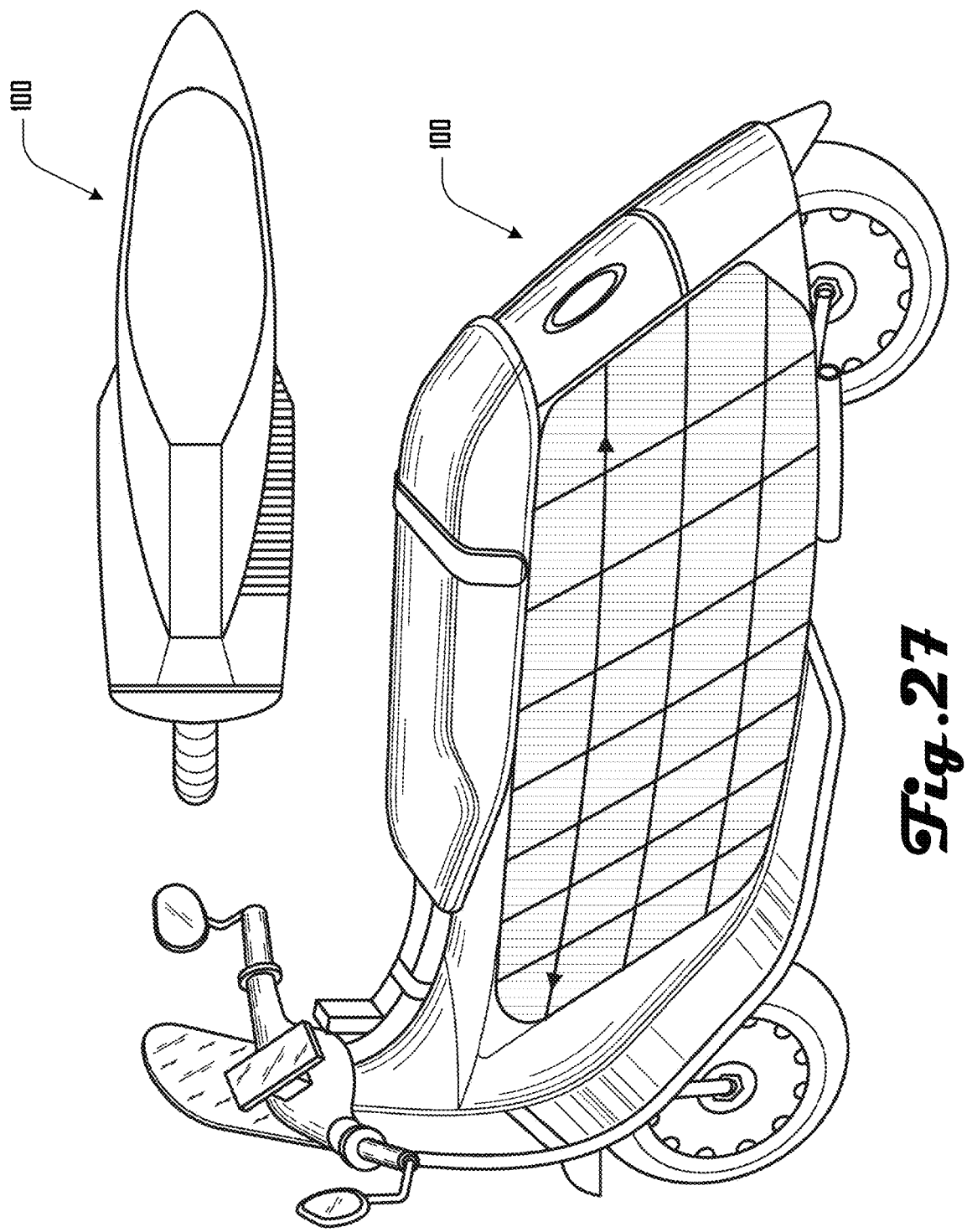
FIG. 27 illustrates a side and top view of a bike in accordance with an embodiment.
Figure 28:
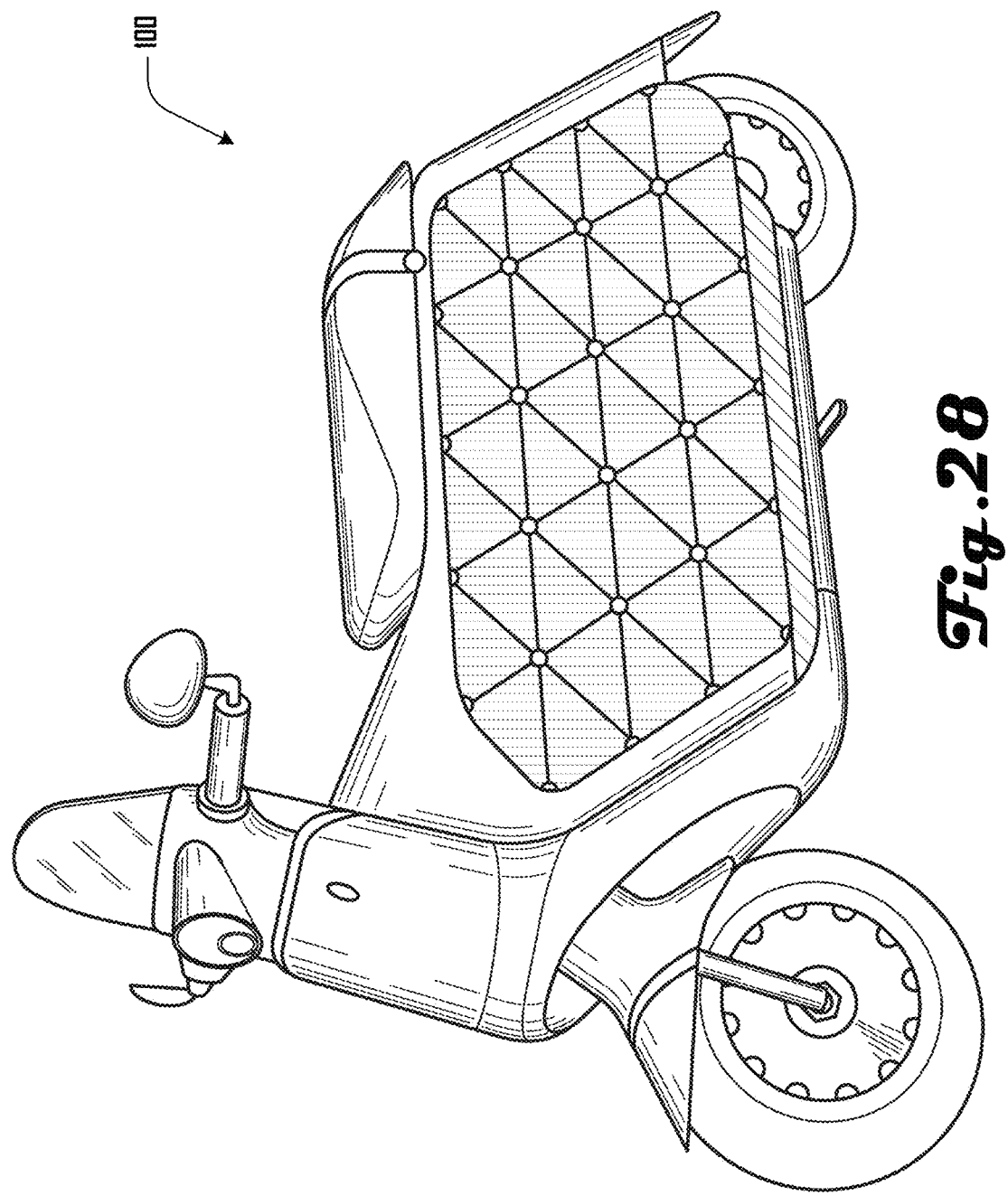
FIG. 28 illustrates a perspective view of a bike in accordance with another embodiment.
Figure 29:
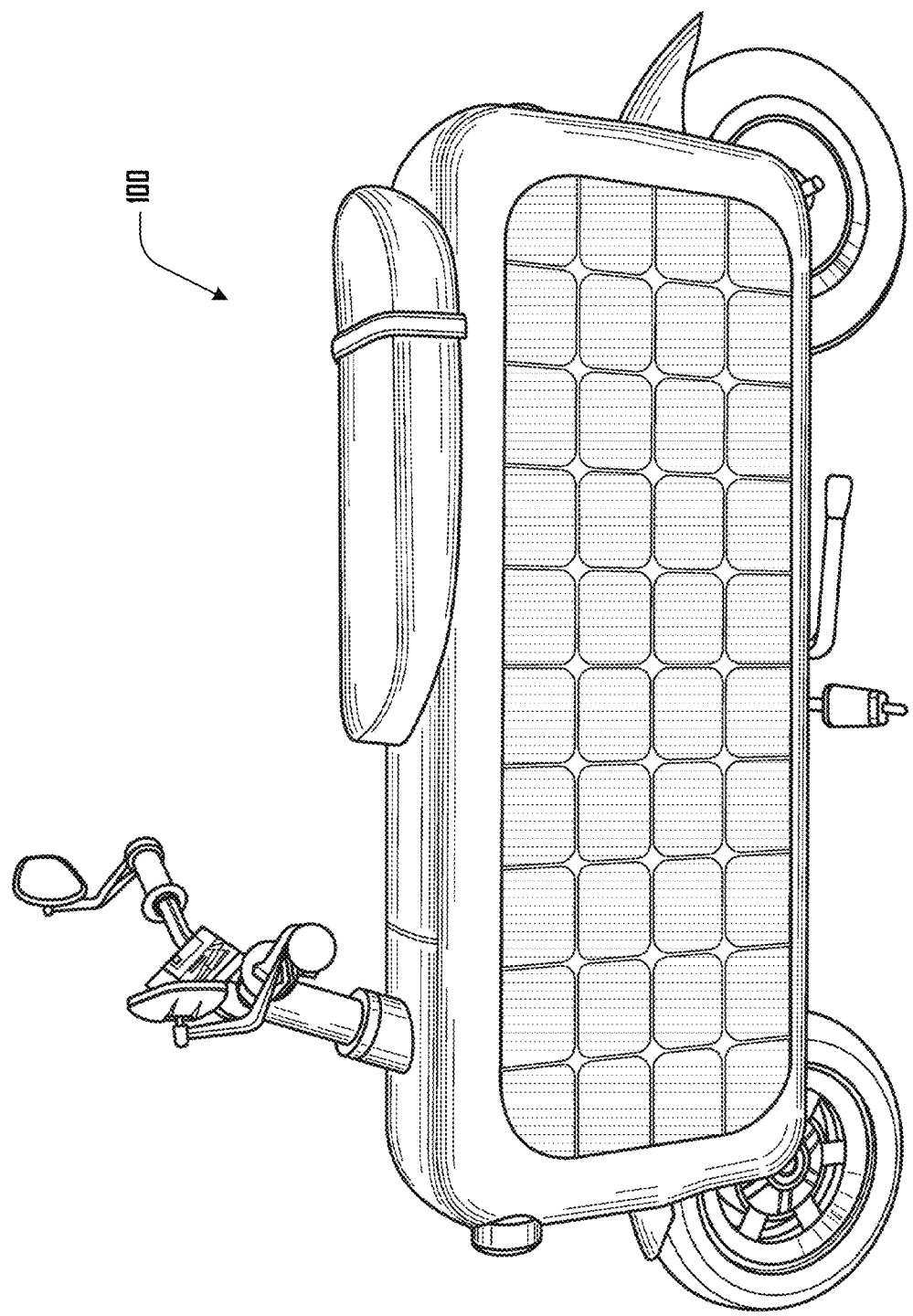
FIG. 29 illustrates a side perspective view of a bike in accordance with a further embodiment.

Various embodiments can be configured for space efficiency. For example, some embodiments include a bike 100 that can "stack" one atop the other so that many can be deployed from a small footprint. This can require a design in some examples that, like chairs, can be largely hollow so that they neatly stack one atop the other. In some embodiments, a bike 100 can be configured to sit on its back (e.g., using an electric wheel 120 to assist tail sitting). For example, FIG. 20 illustrates an example of a bike 100 being rotated from a riding configuration to a standing configuration. In some embodiments, a bike 100 can be configured to fold flat for maximum packing density in fleet and storage applications.

Various embodiments of a bike can be designed for ease of maintenance. For example, wheel alternatives that are less susceptible to getting a flat, solid rubber tires, easily accessible components, and the like, can eliminate maintenance cost.

Although the term bike is used herein, the present specification should be construed to be applicable to various types and classes of vehicles, including a trike, scooter, motorcycle, powered-wheel, cargo bike, moped, boat, copter, plane, and the like. Such vehicles can have any suitable number of wheels, including one, two, three, four, five, six, or the like. Additionally, some embodiments may not have wheels. Some embodiments can be configured for human propulsion and/or charging of a battery 250, which can be in addition to propulsion via one or more motors 220 powered by one or more batteries 250 and/or solar power from one or more solar panel assemblies 130 as discussed herein. For example, some embodiments can include pedals or pedals can be specifically absent. Accordingly, the example embodiments shown and described herein along with the term "bike" should not be construed to be limiting on the wide variety of vehicles that are within the scope and spirit of the present disclosures, and the term "bike" should be construed to cover a wide variety of vehicles. Moreover, the following disclosure should not be construed to be limited to the specific example embodiments described, and the present disclosure should instead be construed to be applicable to any suitable vehicle including land, water or air-based vehicles, which may or may not be operated by a human user. Also, while various embodiments specifically rely on solar and/or battery power with other power or fuel sources being specifically absent (e.g., the bike 100 being without liquid fuel sources, without non-electric power sources, or the like), further embodiments can include deriving power from gasoline, hydrogen, liquid natural gas (LNG), nuclear, or the like. Additionally, specific different embodiments are shown herein; however, further embodiments can comprise any suitable combination of features from any such embodiments, with elements of various embodiments being specifically absent in others. Accordingly, the specific example embodiments should not be considered limiting.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A solar-powered vehicle comprising:
 a body having a front end, rear end, top and opposing sides, the body further defining a cavity;
 two or more wheels;
 a first and second solar panel assembly respectively disposed on the opposing sides of the body;
 one or more electric motor disposed within the cavity of the body between the first and second solar panel assemblies, the one or more electric motors configured to rotate at least one of the two or more wheels;
 one or more electric battery disposed within the cavity of the body between the first and second solar panel assemblies, the one or more electric batteries configured to power the one or more electric motors and to be charged by electric current generated by the first and second solar panel assemblies; and
 reflective elements on the opposing sides of the vehicle having a reflective material that reflects sunlight onto the first and second solar panel assemblies on opposing sides of the body with a reflection factor of greater than 50%, the reflective elements defining respective reflective surfaces that have a surface area greater than 10% of a surface area of the respective first and second solar panel assemblies.

2. The solar-powered vehicle of claim 1, further comprising a third solar panel assembly disposed on the front end of the body of the solar-powered vehicle.

3. The solar-powered vehicle of claim 1, further comprising a third solar panel assembly disposed on the rear end of the body of the solar-powered vehicle.

4. The solar-powered vehicle of claim 1, wherein one or both of the first and second solar panel assemblies are movable to expose a storage compartment defined by the cavity of the body of the solar-powered vehicle, the one or both of the first and second solar panel assemblies being movable by at least one of a sliding mechanism and a rotatable coupling to expose the storage compartment defined by the cavity of the body of the solar-powered vehicle.

5. The solar-powered vehicle of claim 1, wherein the first and second solar panel assemblies cover at least 90% of respective side faces of the sides of the body.

6. The solar-powered vehicle of claim 1, wherein the first and second solar panel assemblies are rotatably coupled on opposing sides of the body of the solar-powered vehicle via rotatable couplings, the first and second solar panel assemblies configured to:
 assume a folded-down configuration suitable for riding the vehicle with the first and second solar panels assemblies disposed against the body of the vehicle with a rider sitting on top of and straddling the vehicle with the rider's legs on opposing sides of the vehicle, and
 assume a folded-up configuration suitable for solar charging of the vehicle while the vehicle is stationary, the folded-up configuration including the first and second solar panel assemblies rotated away from the body of the vehicle.

7. The solar-powered vehicle of claim 1, wherein non-electric power sources are absent from the vehicle.

8. The solar-powered vehicle of claim 1, further comprising a handlebar assembly at a top front end of the solar-powered vehicle rotatably disposed symmetrically about a central axis X of the solar-powered vehicle, the handlebar assembly having handlebars and configured to assume:
 a closed configuration where the handlebars are rotated to be parallel to the central axis X without extending past side faces of the sides of the body of the solar-powered vehicle; and
 an open configuration where the handlebars are rotated away from the central axis X and extending past the side faces of the sides of the body of the solar-powered vehicle.

9. A solar-powered vehicle comprising:
 a body having a front end, rear end, top and opposing sides;
 two or more wheels; and
 a first and second solar panel assembly respectively disposed on the opposing sides of the body; and
 reflective elements on the opposing sides of the vehicle having a reflective material that reflects sunlight onto the first and second solar panel assemblies on opposing sides of the body with a reflection factor of greater than 50%, the reflective elements defining respective reflective surfaces that have a surface area greater than 10% of a surface area of the respective first and second solar panel assemblies.

10. The solar-powered vehicle of claim 9, wherein the body further defines a cavity and wherein the solar-powered vehicle further comprises:
 one or more electric motor disposed within the cavity of the body between the first and second solar panel assemblies, the one or more electric motors configured to rotate at least one of the two or more wheels.

11. The solar-powered vehicle of claim 9, wherein the solar-powered vehicle further comprises:
 a front motor associated with a front hub of a front wheel; and
 a rear motor associated with a rear hub of a rear wheel.

12. The solar-powered vehicle of claim 11, wherein the front and rear motors both comprise regenerative braking and antilock braking to generate energy return from the front and rear wheels.

13. The solar-powered vehicle of claim 9, further comprising a third solar panel assembly disposed on the front end of the body of the solar-powered vehicle.

14. The solar-powered vehicle of claim 9, further comprising a third solar panel assembly disposed on the rear end of the body of the solar-powered vehicle.

15. The solar-powered vehicle of claim 9, wherein one or both of the first and second solar panel assemblies are movable to expose a storage compartment defined by a cavity of the body of the solar-powered vehicle, the one or both of the first and second solar panel assemblies being movable by at least one of a sliding mechanism and a rotatable coupling to expose the storage compartment defined by the cavity of the body of the solar-powered vehicle.

16. The solar-powered vehicle of claim 9, wherein the first and second solar panel assemblies cover at least 75% of respective side faces of the sides of the body.

17. The solar-powered vehicle of claim 9, wherein the first and second solar panel assemblies are rotatably coupled on opposing sides of the body of the solar-powered vehicle via rotatable couplings, the first and second solar panel assemblies configured to:
- assume a folded-down configuration suitable for riding the vehicle with the first and second solar panels assemblies disposed against the body of the vehicle with a rider sitting on top of and straddling the vehicle with the rider's legs on opposing sides of the vehicle, and
- assume a folded-up configuration suitable for solar charging of the vehicle while the vehicle is stationary, the folded-up configuration including the first and second solar panel assemblies rotated away from the body of the vehicle.

18. The solar-powered vehicle of claim 9, further comprising a handlebar assembly at a top front end of the solar-powered vehicle rotatably disposed symmetrically about a central axis X of the solar-powered vehicle, the handlebar assembly having handlebars and configured to assume:
- a closed configuration where the handlebars are rotated to be parallel to the central axis X without extending past side faces of the sides of the body of the solar-powered vehicle; and
- an open configuration where the handlebars are rotated away from the central axis X and extending past the side faces of the sides of the body of the solar-powered vehicle.

* * * * *